(12) United States Patent
Takeda et al.

(10) Patent No.: US 10,669,696 B2
(45) Date of Patent: Jun. 2, 2020

(54) WORK VEHICLE

(71) Applicant: Hitachi Construction Machinery Co., Ltd., Taito-ku Tokyo (JP)

(72) Inventors: Kazuya Takeda, Chiba (JP); Hiroki Gotou, Chiba (JP); Kazuo Ishida, Ibaraki (JP); Yoshihiko Nakazawa, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/096,559

(22) PCT Filed: Sep. 27, 2017

(86) PCT No.: PCT/JP2017/035080
§ 371 (c)(1),
(2) Date: Oct. 25, 2018

(87) PCT Pub. No.: WO2018/062332
PCT Pub. Date: Apr. 5, 2018

(65) Prior Publication Data
US 2019/0161940 A1     May 30, 2019

(30) Foreign Application Priority Data

Sep. 28, 2016 (JP) ................................. 2016-190365

(51) Int. Cl.
*E02F 9/22* (2006.01)
*F16H 61/40* (2010.01)
(Continued)

(52) U.S. Cl.
CPC .............. *E02F 9/2253* (2013.01); *E02F 9/20* (2013.01); *E02F 9/22* (2013.01); *F16H 61/4008* (2013.01)

(58) Field of Classification Search
CPC .. E02F 9/20; E02F 9/22; E02F 9/2253; F16H 61/4008
See application file for complete search history.

(56) References Cited

U.S. PATENT DOCUMENTS 8,666,610 B2 * 3/2014 Shirao ................... B60W 10/06
                                                            172/4.5
9,133,862 B2 * 9/2015 Shirao ................... B60W 10/06
(Continued)

FOREIGN PATENT DOCUMENTS

JP      59-220535 A    12/1984
JP      1-111927 A      4/1989
(Continued)

OTHER PUBLICATIONS

International Search Report (PCT/ISA/210) issued in PCT Application No. PCT/JP2017/035080 dated Dec. 12, 2017 with English translation (five pages).
(Continued)

*Primary Examiner* — Tyler J Lee
(74) *Attorney, Agent, or Firm* — Crowell & Moring LLP

(57) ABSTRACT

In a work vehicle provided with: a working device including an arm and a bucket; a vehicle speed detection device that detects a vehicle speed; a travel drive device that outputs a travel driving force increasing in response to a decrease in the vehicle speed at a time of excavation; and a control device that controls the travel driving force by the travel drive device, the control device is characterized by including a limit control section that limits the travel driving force during a specified time which passes from when the vehicle speed detected by the vehicle speed detection device becomes a predetermined first vehicle speed threshold value or less and the work vehicle plunges into an object to be excavated until an operation of the working device is started.

8 Claims, 22 Drawing Sheets

(51) Int. Cl.
*E02F 9/20* (2006.01)
*F16H 61/4008* (2010.01)

(56) References Cited

U.S. PATENT DOCUMENTS

| | | | | |
|---|---|---|---|---|
| 2006/0150624 A1* | 7/2006 | Shah | ............... | B60W 10/02 |
| | | | | 60/445 |
| 2006/0276948 A1 | 12/2006 | Toda | | |
| 2010/0024412 A1* | 2/2010 | Hyodo | ............ | B60W 10/30 |
| | | | | 60/426 |
| 2010/0095663 A1 | 4/2010 | Hyodo et al. | | |
| 2013/0243556 A1* | 9/2013 | Shirao | ............... | B60W 10/06 |
| | | | | 414/685 |
| 2013/0259619 A1 | 10/2013 | Shirao | | |
| 2017/0274770 A1* | 9/2017 | Aoki | ................. | F16H 59/70 |

FOREIGN PATENT DOCUMENTS

| | | |
|---|---|---|
| JP | 2008-223858 A | 9/2008 |
| WO | WO 2005/024208 A1 | 3/2005 |
| WO | WO 2013/145342 A1 | 10/2013 |

OTHER PUBLICATIONS

Japanese-language Written Opinion (PCT/ISA/237) issued in PCT Application No. PCT/JP2017/035080 dated Dec. 12, 2017 (six pages).

* cited by examiner

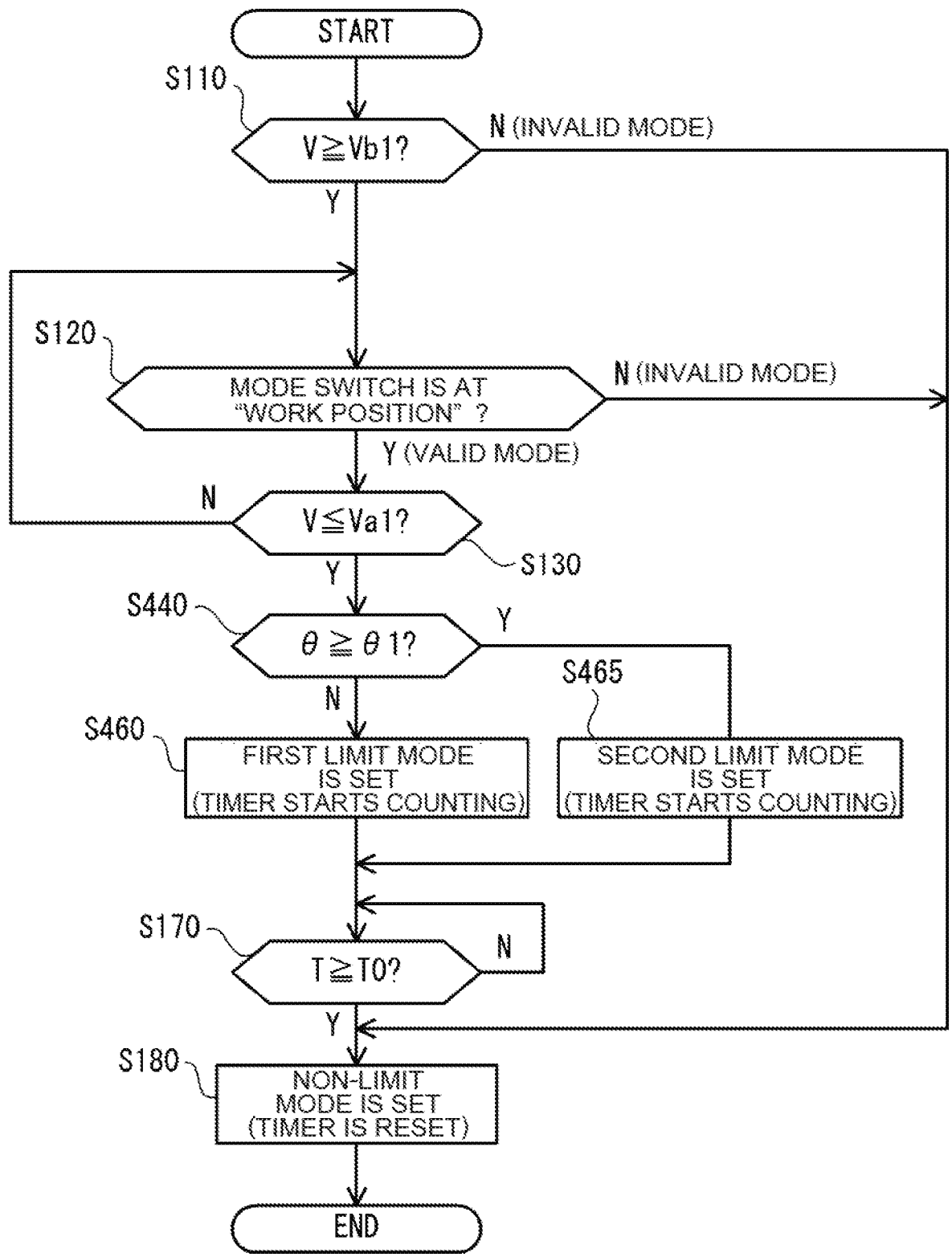

—MOTOR REQUIRED TORQUE MAP—

—MAXIMUM TORQUE MAP—

WORK VEHICLE

TECHNICAL FIELD

The present invention relates to a work vehicle.

BACKGROUND ART

When a work vehicle such as a wheel loader performs an excavation work, if a travel driving force is too large, a working device load is made excessively large and hence a working device speed is reduced or tires slip, which hence impairs a work efficiency. On the other hand, if the travel driving force is too small, a bucket cannot be sufficiently penetrated into an object to be excavated such as the earth and sand, which reduces an excavation volume and impairs the work efficiency.

In patent literature 1 is described such a travel control device of a work vehicle that reduces a maximum value of a displacement volume of a hydraulic motor to a minimum limit value corresponding to a maximum load pressure of a working hydraulic circuit if a load pressure of a working hydraulic circuit is made larger than a specified value.

CITATION LIST

Patent Literature

PATENT LITERATURE 1: JP-A No. 2008-223858

SUMMARY OF INVENTION

Technical Problem

In an excavation work in which a bucket is plunged into an object to be excavated such as earth and sand and then an arm is driven and lifted, there is a case where a reactive force applied by the object to be excavated is applied to a hydraulic cylinder of a work device and where a working device load is made excessively large before the arm is driven. In this case, even if the travel driving force is limited after a load pressure of a working hydraulic circuit is made larger than a specified value, a work efficiency of the excavation work is liable not to be improved.

Solution to Problem

A work vehicle according to an aspect of the present invention includes: a working device that includes an arm and a bucket; a vehicle speed detection device that detects a vehicle speed; a travel drive device that outputs a travel driving force increasing in response to a decrease in the vehicle speed at a time of excavation; and a control device that controls the travel driving force by the travel drive device, in which the control device includes a limit control section that limits the travel driving force during a specified time which passes from when the vehicle speed detected by the vehicle speed detection device becomes a predetermined first vehicle speed threshold value or less and the work vehicle plunges into an object to be excavated until an operation of the working device is started.

Advantageous Effects of Invention

According to the present invention, it is possible to limit the travel driving force in a process before sufficiently penetrating the working device into the object to be excavated and to prevent a working device load from being made excessively large and hence to improve a work efficiency of the excavation work.

BRIEF DESCRIPTION OF DRAWINGS

FIG. 13 is a flow chart to show a processing content of a driving force limit control by a controller related to the fourth embodiment.

DESCRIPTION OF EMBODIMENTS

Hereinafter, one embodiment of a work vehicle according to the present invention will be described with reference to the drawings.

First Embodiment

Figure 1:
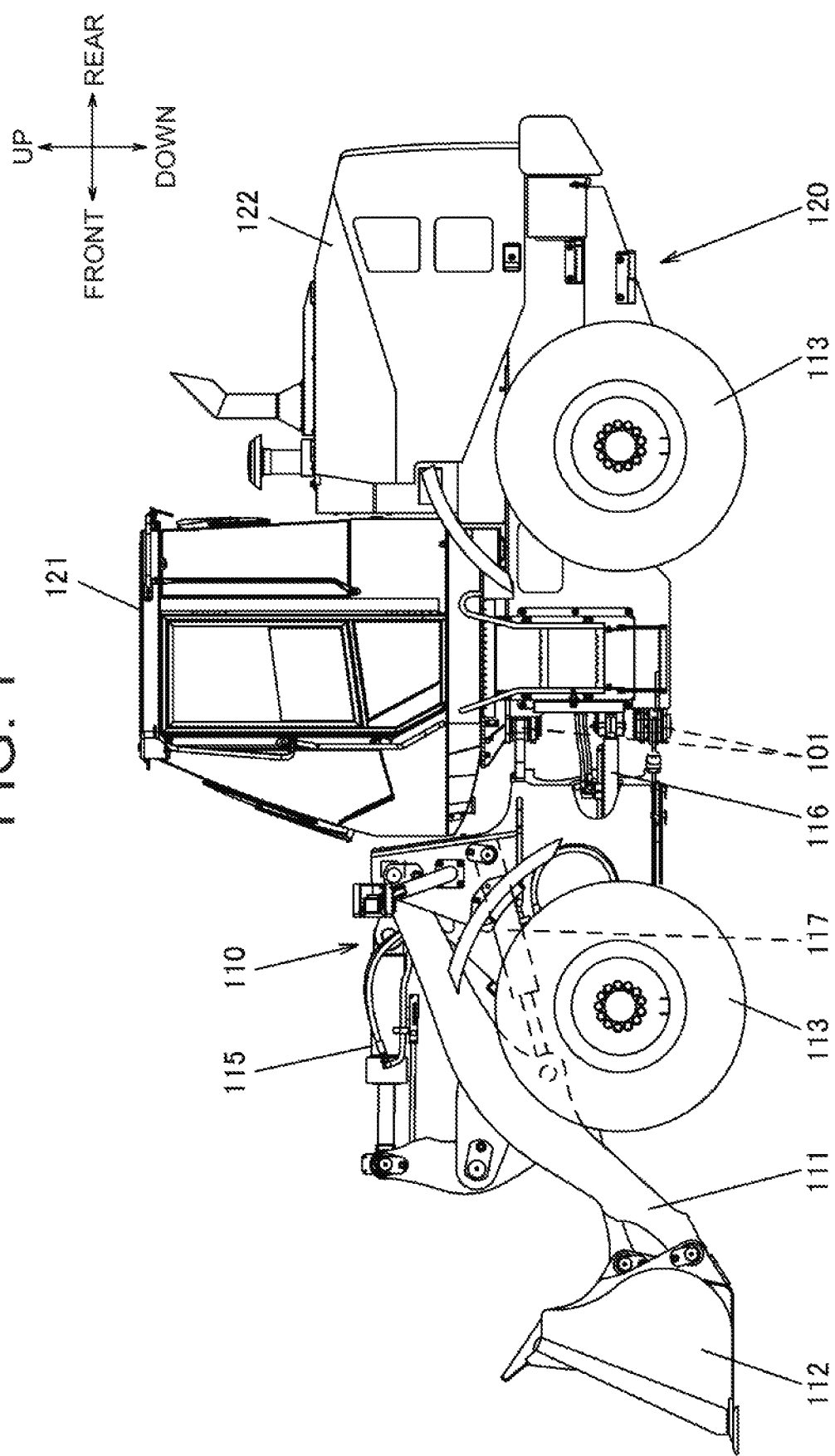
FIG. 1 is a side view of a wheel loader that is an example of a work vehicle.

FIG. 1 is a side view of a wheel loader which is one example of a work vehicle. The wheel loader is composed of a front frame 110 and a rear frame 120, the front frame 110 including an arm 111, a bucket 112, front side wheels 113 (front wheels), and the like, the rear frame 120 including a cab 121, a machine room 122, rear side wheels 113 (rear wheels), and the like.

The arm 111 is driven by an arm cylinder 117, thereby being turned in a vertical direction (being moved down and up), whereas the bucket 112 is driven by a bucket cylinder 115, thereby being turned in a vertical direction (crowding or dumping earth and sand or the like). The front frame 110 and the rear frame 120 are turnably coupled to each other by center pins 101, and thereby the front frame 110 can be bent to the left and right with respect to the rear frame 120 when a steering cylinder 116 is extended or contracted.

A working machine (working device) is so composed as to include the arm 111, the bucket 112, the arm cylinder 117 and the bucket cylinder 115, which are formed in a working hydraulic circuit HC2 (see FIG. 2), and is driven by a pressure oil discharged from a working hydraulic pump 4 (see FIG. 2) driven by an engine 1. Although not shown in the figure, the pressure oil discharged from the working hydraulic pump 4 is supplied to the arm cylinder 117 and the bucket cylinder 115 via a control valve provided in the working hydraulic circuit HC2. When an arm operating lever and a bucket operating lever in the cab 121 are operated, the control valve in the working hydraulic pump circuit HC2 is activated and a hydraulic oil is suitably distributed to the arm cylinder 117 and the bucket cylinder 115, and thereby the arm 111 and the bucket 112 can operate specified operations.

Figure 2:
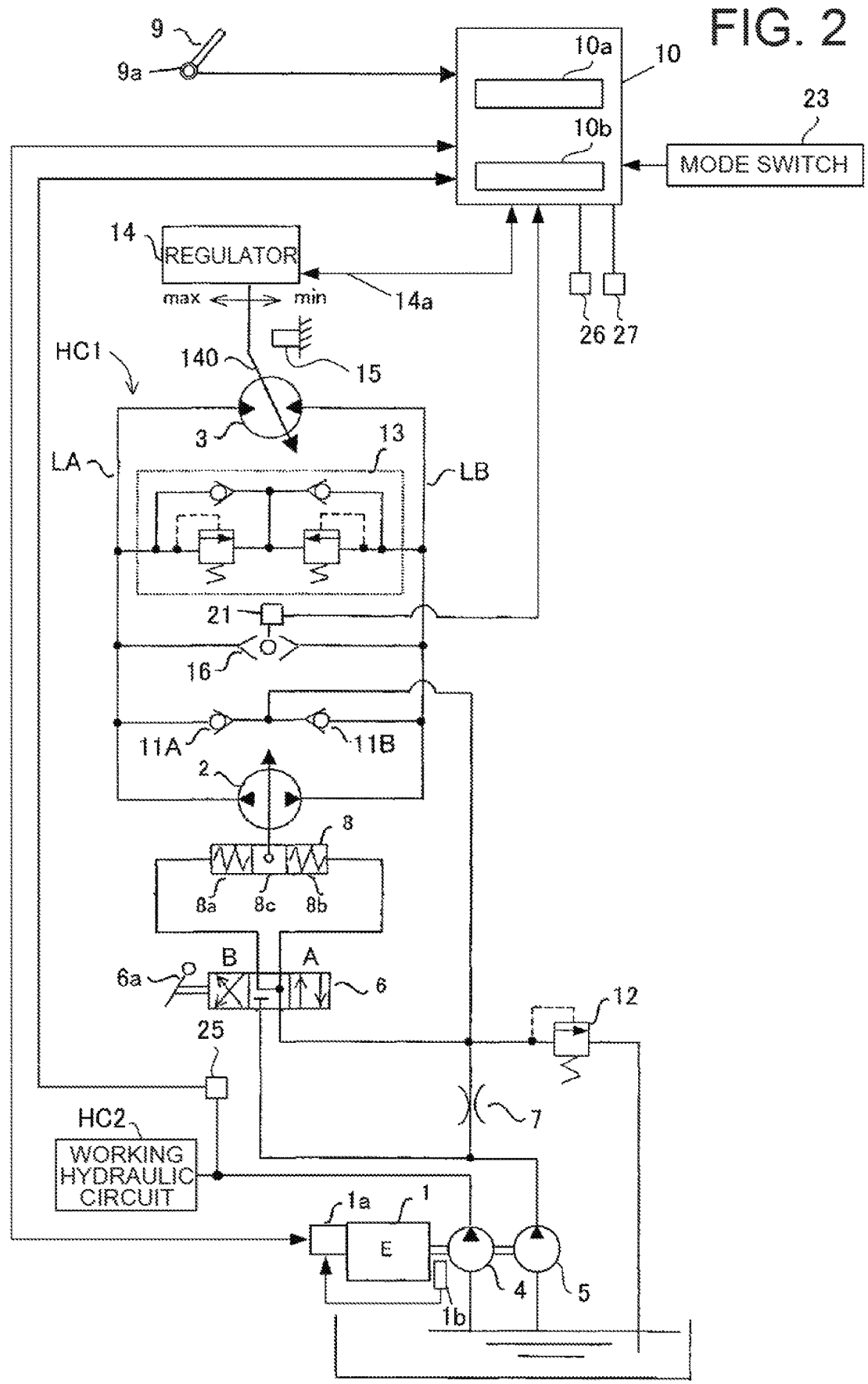
FIG. 2 is a block diagram to show a general composition of a wheel loader related to a first embodiment.

FIG. 2 is a diagram to show a general composition of the wheel loader related to the first embodiment. The wheel loader is provided with a travel drive device that outputs a travel driving force. The travel drive device is provided with a travel hydraulic circuit HC1 and a power transmission mechanism (not shown in the figure). The travel hydraulic circuit HC1 is composed of an HST (Hydro Static Transmission) circuit in which a hydraulic pump of a variable displacement type (hereinafter referred to as HST pump 2) and a hydraulic motor of a variable displacement type (hereinafter referred to as HST motor 3), which are driven by the engine 1, are connected to each other by a pair of main pipelines LA, LB so as to form a closed circuit. A rotation of the HST motor 3 is shifted by a transmission (not shown in the figure) and a shifted rotation is transmitted to the wheels 113 via the power transmission mechanism composed of a propeller shaft (not shown in the drawing), an axle (not shown in the figure) and the like, so that the wheels 113 rotates and hence the wheel loader travels.

The pressure oil discharged from a charge pump 5 driven by the engine 1 is introduced into a tilting cylinder 8 via a forward/backward switching valve 6. The forward/backward switching valve 6 is operated by an operating lever 6a. When the forward/backward switching valve 6 is at a neutral position as shown in the figure, the pressure oil discharged from the charge pump 5 is applied to oil chambers 8a, 8b of the tilting cylinder 8 via a throttle 7 and the forward/backward switching valve 6. In this state, pressures applied to the oil chambers 8a, 8b are equal to each other and hence a piston 8c is at a neutral position. For this reason, a displacement volume qp of the HST pump 2 becomes 0 and hence a pump discharge quantity Q becomes 0.

When the forward/backward switching valve 6 is switched to an A side, an upstream side pressure and a downstream side pressure of the throttle 7 are applied to the oil chambers 8a, 8b respectively, which hence causes a pressure difference in the oil chambers 8a, 8b of the tilting cylinder 8 to thereby displace the piston 8c in a right direction in the figure. In this way, the pump displacement volume qp of the HST pump 2 (pump tilting quantity) is increased and the pressure oil discharged from the HST pump 2 is introduced into the HST motor 3 via the main pipeline LA, and the HST motor 3 is rotated forward to thereby make the vehicle travel forward. When the forward/backward switching valve 6 is switched to a B side, the piston 8c of the tilting cylinder 8 is displaced in a left direction shown in the figure. In this way, the pressure oil discharged from the HST pump 2 is introduced into the HST motor 3 via the main pipeline LB, and the HST motor 3 is rotated in a reverse direction to thereby make the vehicle travel backward. In this regard, when a pressure difference ΔP before and after the throttle 7 becomes a specified value ΔP$_0$ or more, the pump displacement volume qp starts to increase and becomes larger as the pressure difference ΔP becomes larger.

An accelerator pedal 9 is provided with a manipulated variable detection device 9a that detects a manipulated variable of the accelerator pedal 9 and a signal from the manipulated variable detection device 9a is inputted to a controller 10. The controller 10 calculates a target engine rotation speed Nt on the basis of the manipulated variable detected by the manipulated variable detection device 9a and outputs a signal corresponding to the target engine rotation speed Nt to an engine control part 1a. The engine control part 1a compares an actual engine rotation speed Na detected by an engine rotation speed sensor 1b with the target engine rotation speed Nt from the controller 10 Nt and controls a fuel injection device (not shown in the figure) in such a way as to bring the actual engine rotation speed Na close to the target engine rotation speed Nt.

A flow rate (discharge quantity) of the pressure oil discharged from the charge pump 5 is proportional to an engine rotation speed and the pressure difference ΔP before and after the throttle 7 is proportional to the engine rotation speed. For this reason, the pump displacement volume qp is also proportional to the engine rotation speed. The pressure oil discharged from the charge pump 5 passes through the throttle 7 and check valves 11A, 11B and is introduced into the main pipelines LA, LB and is filled into an HST circuit (HC1). A downstream side pressure of the throttle 7 is limited by a charge relief valve 12 and maximum pressures of the main pipelines LA, LB are limited by an overload relief valve 13.

A displacement volume qm of the HST motor 3 (motor tilting angle) is controlled by a regulator 14. The regulator 14 is an electric regulator including an electromagnetic switching valve, an electromagnetic proportional valve, and the like. The regulator 14 is driven by a control current outputted from the controller 10 via a signal line 14$a$, thereby driving a tilt control lever 140 to change the displacement volume qm. A motor tilt control part is provided with a stopper 15, and when the tilt control lever 140 abuts against the stopper 15, a minimum value of the motor displacement volume qm is limited mechanically to a specified value qmin. In this regard, when the control current is not passed through the regulator 14, the tilt control lever 140 abuts against the stopper 15, and thereby the motor displacement volume qm is held at the specified minimum value qmin. When the control current outputted to the regulator 14 is increased, the motor displacement volume qm is increased.

The controller 10 is so composed as to include a calculation processing device including a CPU, a ROM, a RAM, and other peripheral circuit. The controller 10 functionally includes a validity/invalidity mode setting section 10$a$ and a limit control section 10$b$.

The controller 10 has a vehicle speed sensor 26 connected thereto. The vehicle speed sensor 26 detects information corresponding to a travel speed (vehicle speed) V of the vehicle and outputs a detection signal to the controller 10. The vehicle speed sensor 26 is composed of, for example, a rotation speed detection device that detects a rotation speed of an output shaft of a transmission (not shown in the figure) connected to the HST motor 3.

The controller 10 has a signal from a travel load pressure sensor 21 and a signal from a mode switch 23 inputted thereto, the travel load pressure sensor 21 detecting a pressure of the main pipelines LA, LB (travel load pressure Pt) on a high pressure side selected by a high-pressure selector valve 16. The mode switch 23 is a switch in which either of operation positions of a travel position and a work position is selected by an operator and outputs an operation signal corresponding to the selected operation position to the controller 10.

The validity/invalidity mode setting section 10$a$ determines whether or not a valid individual condition 1 and a valid individual condition 2, which will be described below, are satisfied. In a case where both of the valid individual condition 1 and the valid individual condition 2 are satisfied, the validity/invalidity mode setting section 10$a$ determines that a valid condition is satisfied and sets a valid mode. In a case where either of the valid individual condition 1 and the valid individual condition 2 is not satisfied, the validity/invalidity mode setting section 10$a$ determines that the valid condition is not satisfied and sets an invalid mode.
(Valid individual condition 1) A vehicle speed V detected by the vehicle speed sensor 26 is a threshold value Vb1 for validity determination or more
(Valid individual condition 2) The mode switch 23 is operated to the work position.

Figure 3:
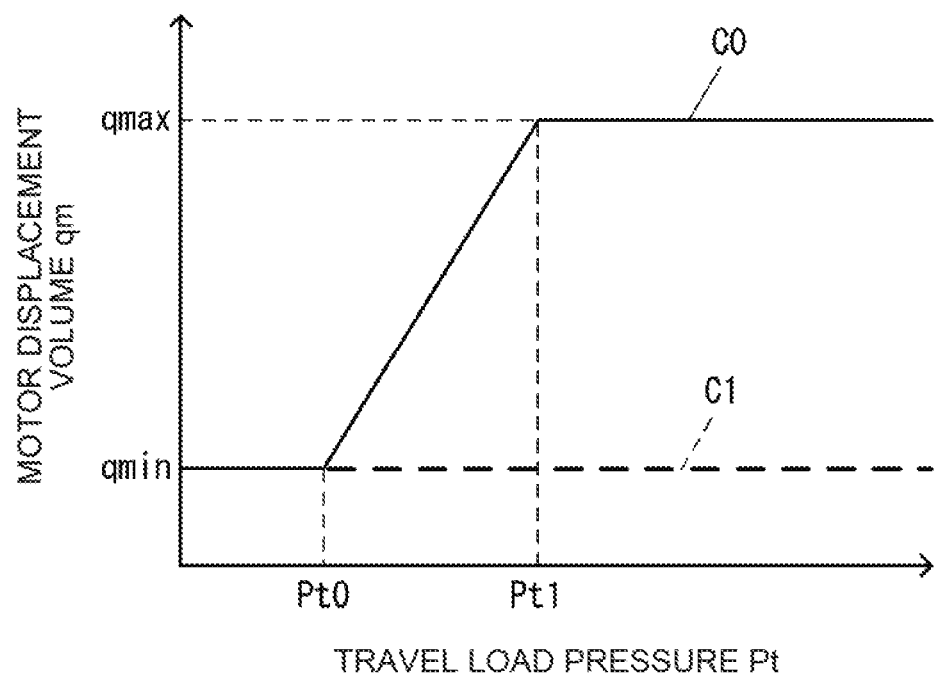
FIG. 3 is a diagram to show a relationship between a travel load pressure Pt and a motor displacement volume qm.

The limit control section 10$b$ controls the motor displacement volume qm according to the travel load pressure Pt detected by the travel load pressure sensor 21. FIG. 3 is a graph to show a relationship between the travel load pressure Pt and the motor displacement volume qm. A storage device of the controller 10 has a non-limit characteristic C0 and a limit characteristic C1 stored therein in a look-up table style. The non-limit characteristic C0 is a characteristic in which when the travel load pressure Pt is less than a specified value Pt0, the motor displacement volume qm becomes a minimum value qmin. The non-limit characteristic C0 is a characteristic in which when the travel load pressure Pt increases from a specified value Pt0 to a specified value Pt1, the motor displacement volume qm increases linearly from the minimum value qmin to a maximum value qmax and in which when the travel load pressure Pt becomes more than the specified value Pt1, the motor displacement volume qm becomes the maximum value qmax.

The limit characteristic C1 is a characteristic in which the motor displacement volume qm becomes the minimum value qmin regardless of the travel load pressure Pt.

The limit control section 10$b$ determines whether or not a limit individual condition 1 and a limit individual condition 2, which will be described below, are satisfied. In a case where both of the limit individual condition 1 and the limit individual condition 2 are satisfied, the limit control section 10$b$ determines that a limit condition is satisfied and sets a limit mode. In a case where either of the limit individual condition 1 and the limit individual condition 2 is not satisfied, the limit control section 10$b$ determines that the limit condition is not satisfied and sets a non-limit mode.
(Limit individual condition 1) A valid mode is set.
(Limit individual condition 2) The vehicle speed V detected by the vehicle speed sensor 26 is a threshold value Va1 for limit start determination or less.

The threshold value Va1 for limit start determination corresponds to a vehicle speed immediately after the bucket 112 is plunged into an object to be excavated such as earth and sand and is determined in advance on the basis of an experiment or the like. As to the threshold value Va1 for limit start determination, for example, a value as large as 4 km/h is stored previously in the storage device of the controller 10. In this regard, the above-mentioned threshold value Vb1 for validity determination is larger than the threshold value Va1 for limit start determination (Vb1>Va1) and is determined in advance on the basis of an experiment or the like so as to prevent a maximum travel driving force A, which will be described later, from hunting between a limit value and a non-limit value. As to the threshold value Vb1 for validity determination, for example, a value as large as 5 km/h is stored previously in the storage device of the controller 10.

When the non-limit mode is set, the limit control section 10$b$ refers to a table of the non-limit characteristic C0 and calculates the motor displacement volume qm on the basis of the travel load pressure Pt detected by the travel load pressure sensor 21.

When the limit mode is set, the limit control section 10$b$ controls the motor displacement volume qm on the basis of the limit characteristic C1. In the present embodiment, the limit characteristic C1 is a constant value (minimum value qmin), so the motor displacement volume qm is set to the minimum value qmin while the limit mode is set regardless of the travel load pressure Pt.

The limit control section 10$b$ keeps the control mode during a period of a time threshold value T0. The time threshold value T0 is stored previously in the storage device of the controller 10. The time threshold value T0 corresponds to a period of time that passes from when the vehicle speed V becomes 0 (stops) from the threshold value Va1 for limit start determination Va1, in other words, a period of time that passes from when the wheel loader plunges into the object to be excavated such as earth and sand until the working device starts to operate, and is set to an arbitrary time in advance by an experiment or the like. For example, a value as large as 0.4 second is set to the time threshold value T0.

When the limit mode is set, the limit control section 10b starts measuring a time by a built-in timer. When the time T measured by the timer becomes the time threshold value T0 or more, in other words, a specified time (T0) passes from when the limit mode is set, the limit control section 10b switches the mode from the limit mode to the non-limit mode to release the limit control of the travel driving force.

A product of the travel load pressure Pt and the motor displacement volume qm corresponds to an output torque of the HST motor 3. The rotation speed of the HST motor 3 is expressed by an equation of "discharge quantity Q of pump×motor volume efficiency/motor displacement volume qm". A travel speed of the vehicle (vehicle speed) is proportional to a motor rotation speed. Hence, when the travel load pressure Pt is large and the motor displacement volume qm is large, the vehicle can travel at a low speed and at a high torque, whereas when the travel load pressure Pt is small and the motor displacement volume qm is small, the vehicle can travel at a high speed and at a low torque.

Figure 4:
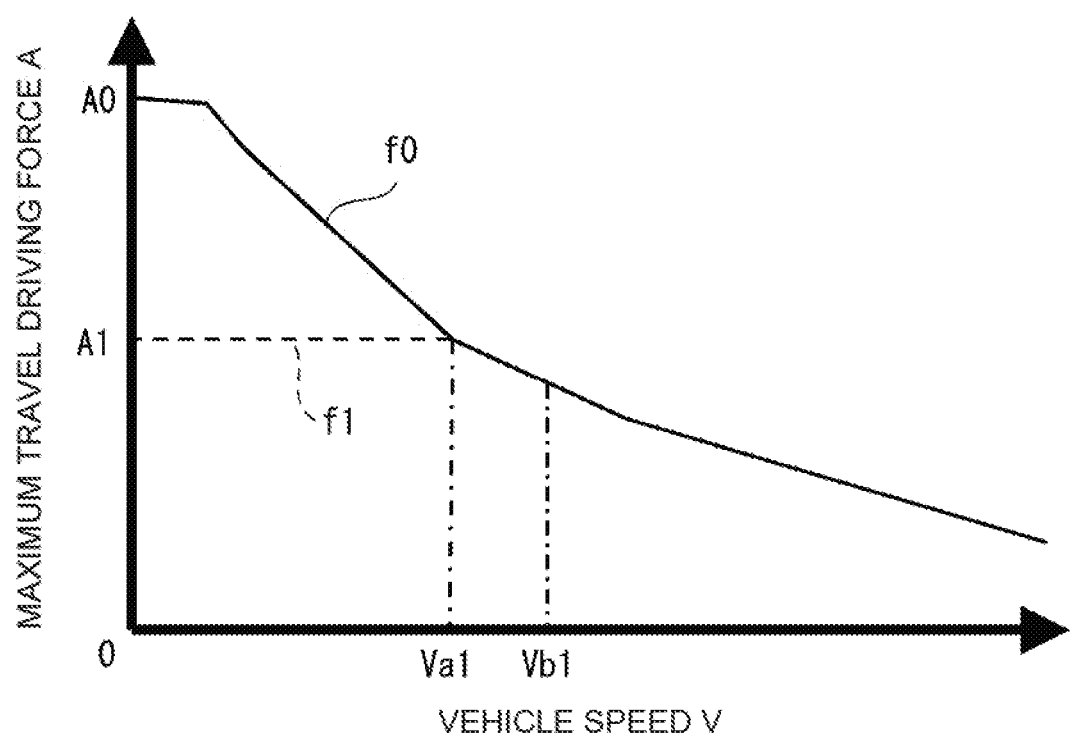
FIG. 4 is a travel performance diagram to show a relationship between a vehicle speed V and a maximum travel driving force A of a work vehicle related to the first embodiment.

FIG. 4 is a travel performance diagram to show a relationship between the vehicle speed V and the maximum travel driving force A in a case where the accelerator pedal 9 is pressed down to a maximum level, in other words, in a case where the target engine rotation speed is set to a maximum speed. In FIG. 4, a characteristic f0 when the non-limit mode is set is expressed by a solid line and a characteristic f1 when the limit mode is set is expressed by a broken line. According to a travel performance curve (f0) shown in FIG. 4, as the vehicle speed increases, the maximum travel driving force A that can be outputted (maximum traction force) decreases.

When the limit mode is set, the motor displacement volume qm is held at the minimum value qmin regardless of a magnitude of the travel load pressure Pt. In this way, when the motor displacement volume qm is held at the minimum value qmin, the maximum travel driving force A decreases as compared with the characteristic f0 as shown by the characteristic f1. For example, in a case where the vehicle speed V is 0, the maximum travel driving force is A0 in the characteristic f0, whereas the maximum travel driving force is A1 in the characteristic f1 (A1<A0). In this regard, a difference between the maximum travel driving force A of the characteristic f0 and the maximum travel driving force A of the characteristic f1 corresponds to a limit amount of the maximum travel driving force.

In the present embodiment, the maximum travel driving force A is limited in such a way that the maximum travel driving force A becomes A1 (constant value) within a range in which the vehicle speed V is 0 or more and the threshold value Va1 for limit start determination or less. When the specified time (T0) passes after the limit mode is set and then the limit mode is transferred to the non-limit mode, the travel performance is also transferred from the characteristic f1 to the characteristic f0. For this reason, when the limit mode is transferred to the non-limit mode within a range in which the vehicle speed V is 0 or more and Va1 or less, the maximum travel driving force that can be outputted increases.

Figure 5:
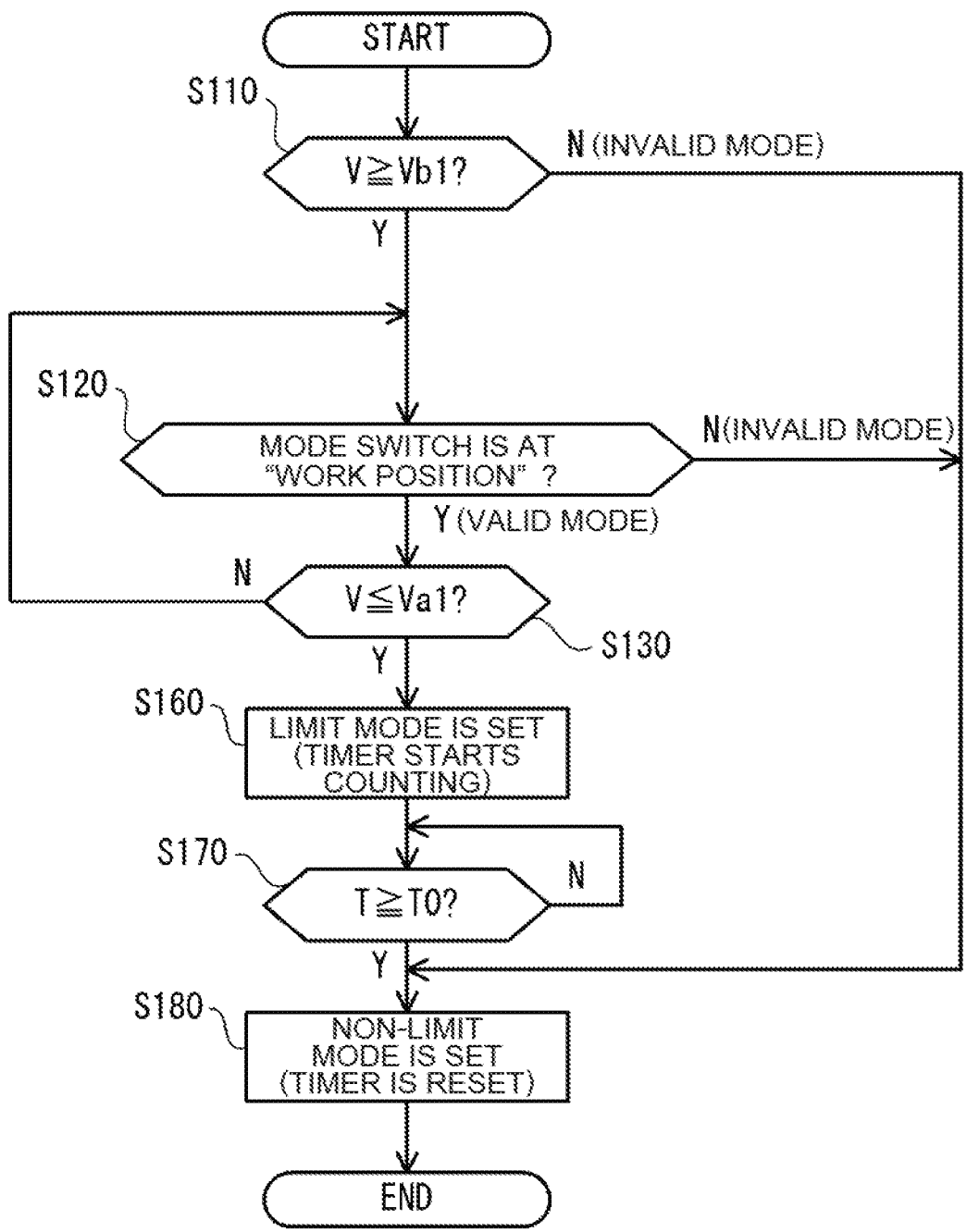
FIG. 5 is a flow chart to show a processing content of a driving force limit control by a controller related to the first embodiment.

FIG. 5 is a flow chart to show a processing content of a driving force limit control by the controller 10 related to the first embodiment. The processing shown by the flow chart is started, for example, when an ignition switch (not shown in the figure) is turned on and an initial setting (not shown in the figure) is performed and is executed repeatedly. In the initial setting, the non-limit mode is set. In this regard, although not shown in the figure, the controller 10 repeatedly acquires various kinds of information such as the information of the vehicle speed detected by the vehicle speed sensor 26 and the information of the operation position of the mode switch 23.

In a step S110, the controller 10 determines whether or not the vehicle speed V detected by the vehicle speed sensor 26 is the threshold value Vb1 for validity determination or more. If an affirmative determination is made in the step S110, the process proceeds to a step S120. If a negative determination is made in the step S110, the controller 10 sets the invalid mode and the process proceeds to a step S180.

In the step S120, the controller 10 determines whether or not the operation position of the mode switch 23 is the work position. If an affirmative determination is made in the step S120, in other words, if it is determined that the mode switch 23 is operated to the work position, the controller 10 sets the valid mode and the process proceeds to a step S130. If a negative determination is made in the step S120, that is, if it is determined that the mode switch 23 is operated to the travel position, the controller 10 sets the invalid mode and the process proceeds to the step S180.

In the step S130, the controller 10 determines whether or not the vehicle speed V detected by the vehicle speed sensor 26 is the threshold value Va1 for limit start determination or less. If an affirmative determination is made in the step S130, the process proceeds to a step S160. If a negative determination is made in the step S130, the process returns to the step S120.

In the step S160, the controller 10 sets the limit mode and starts counting a timer and the process proceeds to a step S170. In the step S170, the controller 10 determines whether or not the time T measured by the timer is the time threshold value T0 or more. The measurement of time by the timer is performed until the measured time T becomes larger than the time threshold value T0 (specified value) stored in the storage device of the controller 10. The controller 10 repeatedly performs the processing of the step 170 until an affirmative determination is made and if the affirmative determination is made, the process proceeds to the step S180.

In the step S180, the controller 10 sets the non-limit mode and resets the timer to finish the processing shown by the flow chart of FIG. 5. Then, in the next control period, the processing from the step S110 to the step S180 is again executed.

In this way, the controller 10 related to the present embodiment limits the maximum travel driving force during a period of time of the time threshold value T0 from when the vehicle speed V decreases to a value of the predetermined threshold value Va1 for limit start determination or less. In this way, in an excavation work, a balance between a resultant force of an inertial force, which is applied by a self-weight of the wheel loader, and the travel driving force and an excavation force (force moving up the working device) can be made appropriate.

Figure 6:
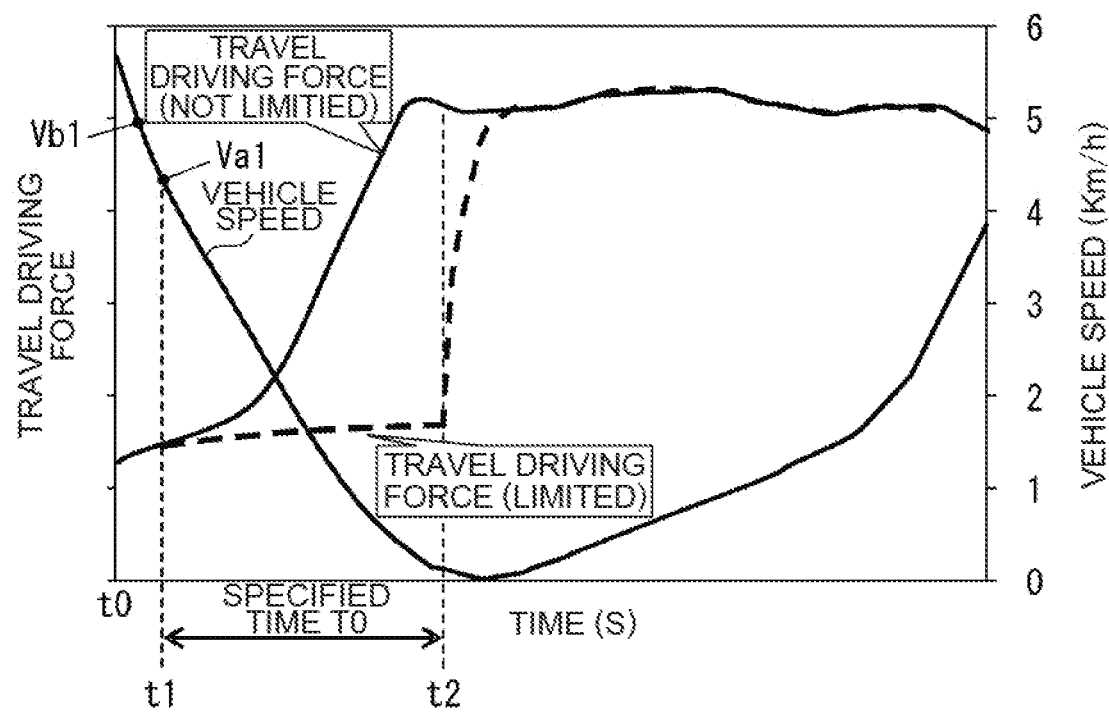
FIG. 6 is a time chart to show a change in a travel driving force and a change in a vehicle speed in an excavation work of the work vehicle related to the first embodiment.

FIG. 6 is a time chart to show a change in the travel driving force and a change in the vehicle speed in an excavation work. In FIG. 6, a behavior of the travel driving force in a case where the maximum travel driving force A is limited is expressed by a broken line, whereas a behavior of the travel driving force in a case where the maximum travel driving force A is not limited is expressed by a solid line.

A case where the travel driving force is limited will be described. The operator operates the mode switch 23 to the work position in advance. The operator operates the accelerator pedal 9 and the steering wheel, thereby moving the wheel loader forward toward the object to be excavated such as earth and sand. The operator plunges the wheel loader into the object to be excavated at a vehicle speed of the threshold value Vb1 for validity determination or more (see timing t0).

When the wheel loader is plunged into the object to be excavated and the vehicle speed is decreased by a reaction force from the object to be excavated and becomes the threshold value Va1 for limit start determination or less, the limit mode is set and the travel driving force (traction force) is limited. The maximum travel driving force A is limited continuously from a timing t1 when the limit mode is set to a timing t2 when a time of the time threshold value T0 passes from the timing t1 (see timing t1 to timing t2).

The operator operates the bucket 112 and the arm 111 while pressing down the accelerator pedal 9 and excavates the earth and sand while moving the wheel loader forward to generate the travel driving force, thereby loading the bucket 112 with the object to be excavated. According to the present embodiment, the travel driving force is limited immediately after the wheel loader plunges into the object to be excavated, so when the arm 111 is moved up to generate an excavation force, a resultant force (force in a horizontal direction) of the inertial force, which is applied by the self-weight of the wheel loader, and the travel driving force and the resultant force of the excavation force (force in a vertical direction) can be made appropriate in a direction and in magnitude. In this way, an excavation performance can be improved.

When the time of the time threshold value T0 passes after the vehicle speed V decreases to the value of the threshold value Va1 for limit start determination or less, the non-limit mode is set and the limitation of the travel driving force is released. For this reason, the travel driving force increases from the timing t2.

When a case where the travel driving force is not limited will be described as a comparative example. For example, in a case where the wheel loader is plunged into the object to be excavated in a state where the mode switch 23 is operated to the travel position, the maximum travel driving force A is not limited even if the vehicle speed V is decreased to a value of Va1 or less. For this reason, as the bucket 112 is penetrated into the object to be excavated and a penetration amount increases more, the travel driving force increases more (see timing t1 to timing t2).

In the comparative example, as compared with the present embodiment, the travel driving force increases greatly immediately after the wheel loader is plunged into the object to be excavated. When the bucket 112 and the arm 111 are driven in a state where the travel driving force is large, a working device load is made excessive, which hence is liable to reduce a working speed of the working device, to stop working the working device, and to slip the wheels 113. When the working speed of the working device is reduced and the wheels 113 are made to slip, a work efficiency is reduced.

According to the embodiment described above, the following operational effect can be obtained.

(1) The wheel loader related to the present embodiment is the work vehicle provided with the travel drive device, which outputs the travel driving force, and the working device. The controller 10 of the wheel loader limits the maximum travel driving force during the specified time (T0) which passes after the vehicle speed V detected by the vehicle speed sensor 26 decreases to the value of the predetermined threshold value Va1 for limit start determination or less. In a case where the limit mode is set, by limiting the maximum travel driving force as compared with a case where the non-limit mode is set, the travel driving force is limited in a process in which the working device is sufficiently penetrated into the object to be excavated, which hence can prevent the working device load from being made excessively large. As a result, a balance between the resultant force of the inertial force of the vehicle body and the travel driving force when the wheel loader is plunged into the object to be excavated and the excavation force can be made appropriate and hence the work efficiency of the excavation can be improved.

(2) The limitation of the travel driving force is released after the specified time (T0) passes from the time when the limitation of the travel driving force is started. For this reason, even in a case where the limit condition is satisfied, for example, at the time when the wheel loader climbs up a slope and the limit control of the travel driving force is performed, the limitation is released after the specified time (T0 (for example, as small as 0.4 second)), which hence does not interfere with the wheel loader climbing up the slope.

Further, in the excavation work, there is also a case where the vehicle does not stop after the bucket 112 is plunged into the object to be excavated. In a case where the limit control of the travel driving force is released for a reason of detecting that the vehicle stops, a state where the limit of the travel driving force is not released is liable to continue during a period of the excavation work and hence the work efficiency is liable to be reduced. In contrast to this, in the present embodiment, the limit of the travel driving force is released after the specified time (T0) passes, which hence can prevent a state where the travel driving force is limited from continuing during a period of the excavation work.

(3) The valid/invalid mode setting section 10a of the controller 10 sets the invalid mode to invalidate the limitation of the maximum travel driving force A during the specified time (T0) which passes after the vehicle speed V detected by the vehicle speed sensor 26 decreases to the value of the threshold value Va1 for limit start determination or less. In the present embodiment, the valid mode or the invalid mode are set in consideration of the operation position of the mode switch 23. In this way, the operator can set the invalid mode not to limit the maximum travel driving force A according to contents of work.

(4) The controller 10 determines whether or not the vehicle speed V detected by the vehicle speed sensor 26 is higher than the threshold value Vb1 for validity determination which is higher than the threshold value Va1 for limit start determination, and in a case where the vehicle speed V decreases to the value of the threshold value Va1 for limit start determination or less from a state where the vehicle speed V is higher than the threshold value Vb1 for validity determination, the controller 10 limits the maximum travel driving force A during the specified time (T0). It is made the valid individual condition that the vehicle speed V is increased to a value of the threshold value Vb1 for validity determination or more, the threshold value Vb1 for validity determination being higher than the threshold value Va1 for limit start determination, so it is possible to prevent the maximum travel driving force A from hunting between a limit value and a non-limit value.

(5) The wheel loader is provided with a travel drive device including the HST circuit in which the hydraulic pump (HST pump 2) of the variable displacement type and the hydraulic motor (HST motor 3) of the variable displacement type are connected to each other so as to form the closed circuit. In the wheel loader provided with the HST circuit, when the vehicle speed is reduced by a reaction force applied by the object to be excavated in the excavation work, the travel driving force is increased continuously and speedily in response to a decrease in the vehicle speed and hence the resultant force of the inertial force applied by the self-weight of the vehicle and the travel driving force is liable to become excessive. For this reason, according to the present embodiment, an effect produced by limiting the travel driving force immediately after the wheel loader is plunged into the object to be excavated is enhanced as compared with an effect produced by a work vehicle which transmits an engine output via the torque converter, that is, a work vehicle of the so-called torque converter driven type.

(Modification of the First Embodiment)

In the first embodiment has been described an example in which the maximum travel driving force A is limited by reducing the displacement volume qm of the HST motor 3 (motor tilting angle) with reference to the limit characteristic C1 stored in the storage device of the controller 10, but the present invention is not limited to this example. For example, the maximum travel driving force A may be limited by reducing the travel load pressure Pt (that is, a driving pressure of the HST motor 3). Further, the maximum travel driving force A may be limited by reducing both of the displacement volume qm of the HST motor 3 and the travel load pressure Pt. In this regard, the travel load pressure Pt can be regulated by providing the HST circuit with a variable relief valve and by outputting a control signal (exciting current) to a solenoid of the variable relief valve by the controller 10.

It is also recommended that a table (see FIG. 4) of the characteristic of the maximum travel driving force A according to the vehicle speed V is stored in the storage device of the controller 10 and that the controller 10 controls the displacement volume qm of the HST motor 3 and the travel load pressure Pt in such a way that the maximum travel driving force does not exceed the maximum travel driving force A at the detected vehicle speed V.

Second Embodiment

A work vehicle related to a second embodiment will be described with reference to FIG. 7 and FIG. 8. In this regard, in the drawings, the same or equivalent parts as in the first embodiment will be denoted by the same reference signs and different points will be mainly described. A wheel loader related to the second embodiment has the same composition as the first embodiment (see FIG. 2).

Figure 7:
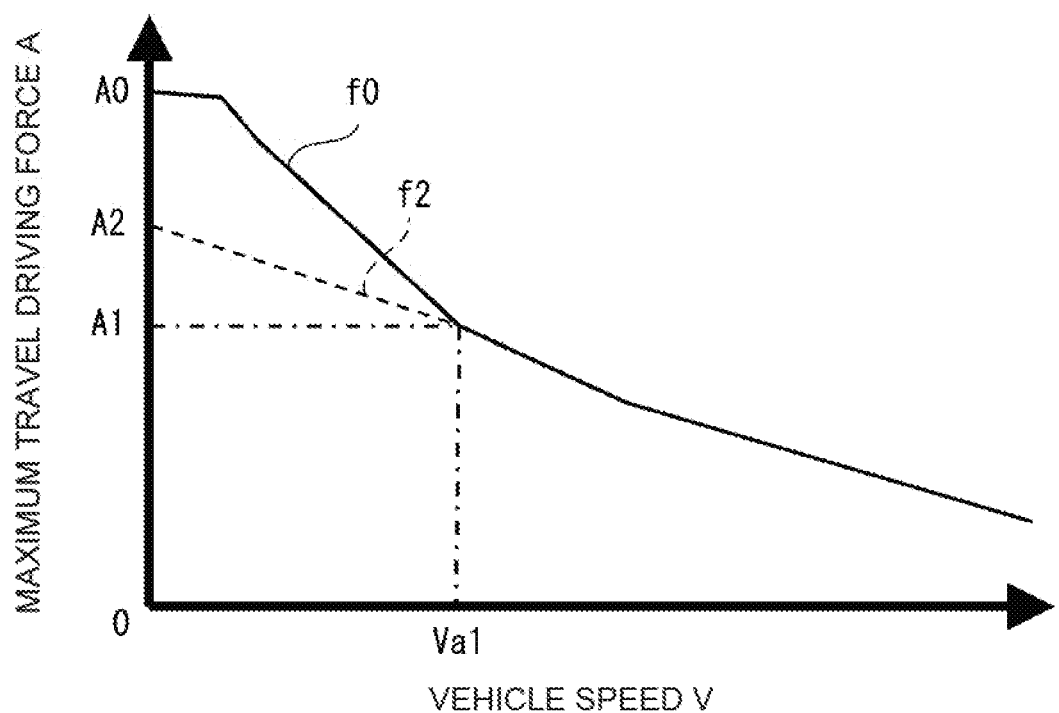
FIG. 7 is a travel performance diagram to show a relationship between a vehicle speed V and a maximum travel driving force A of a work vehicle related to a second embodiment.
Figure 8:
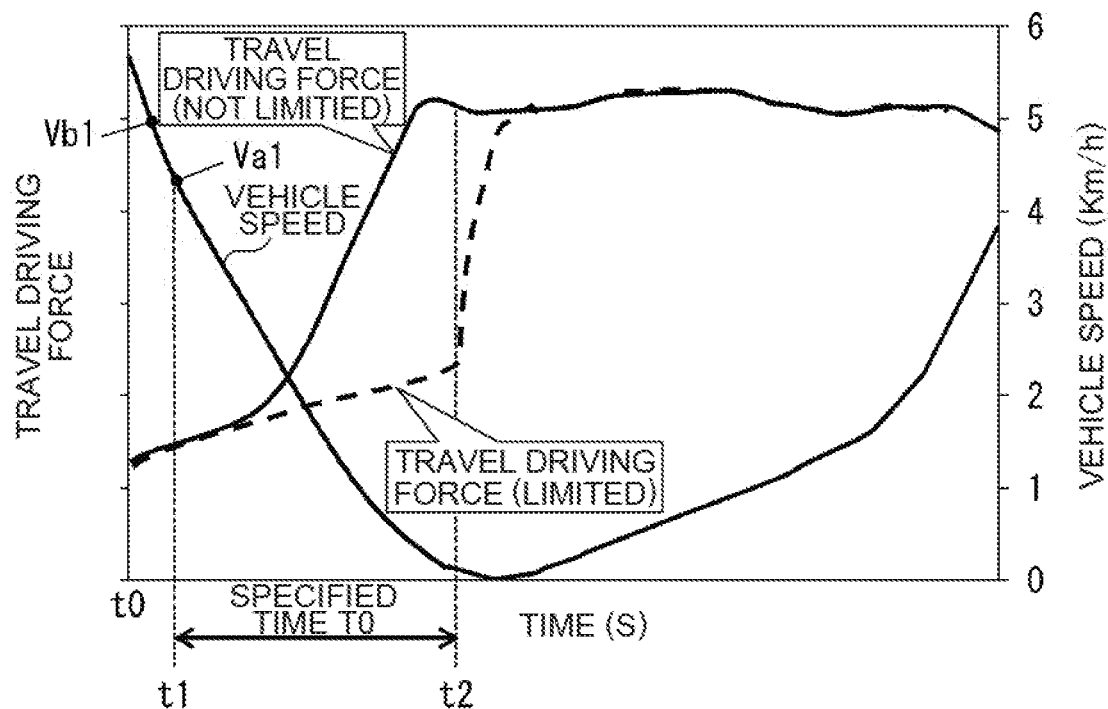
FIG. 8 is a time chart to show a change in a travel driving force and a change in a vehicle speed in an excavation work of the work vehicle related to the second embodiment.

FIG. 7 is a travel performance diagram to show a relationship between the vehicle speed V and the maximum travel driving force A of the work vehicle related to the second embodiment. FIG. 8 is a time chart to show a change in the travel driving force and the vehicle speed in an excavation work of the work vehicle related to the second embodiment.

In the first embodiment, the maximum travel driving force A is limited in such a way that the maximum travel driving force A becomes A1 (constant value) within a range in which the vehicle speed is 0 or more to the threshold value Va1 for limit start determination or less (see FIG. 4). In contrast to this, in the second embodiment, the limit control section 10b of the controller 10 limits the maximum travel driving force A according to a characteristic f2 shown in FIG. 7. The limitation of the maximum travel driving force A can be realized by reducing one or both of the displacement volume qm of the HST motor 3 and the pressure of the HST motor 3.

The limit control section 10b limits the maximum travel driving force in such a way that, within the range in which the vehicle speed is 0 or more and the threshold value Va1 for limit start determination or less, the maximum travel driving force A increases linearly as the vehicle speed V decreases. In other words, as the vehicle speed V decreases, the limit control section 10b makes a limit amount to limit the maximum travel driving force A smaller as compared with the first embodiment. In this regard, when the vehicle speed V is 0, the maximum travel driving force A becomes A2 which is larger than A1 and smaller than A0 (A0>A2>A1).

According to the second embodiment described above, not only the same operation and effect as the first embodiment but also the following operation and effect can be acquired.

(6) In a case where the limit mode is set, the limit control section 10b of the controller 10 limits the maximum travel driving force in such a way that the maximum travel driving force A increases as the vehicle speed V detected by the vehicle speed sensor 26 decreases. The inertial force of the wheel loader decreases as the vehicle speed V decreases. For this reason, as shown in FIG. 8, by gradually increasing the maximum travel driving force in response to a decrease in the vehicle speed V, that is, a decrease in the inertial force, the balance between the result force of the inertial force by the self-weight of the vehicle and travel driving force and the excavation force can be made appropriate.

(Modification of Second Embodiment)

Figure 9:
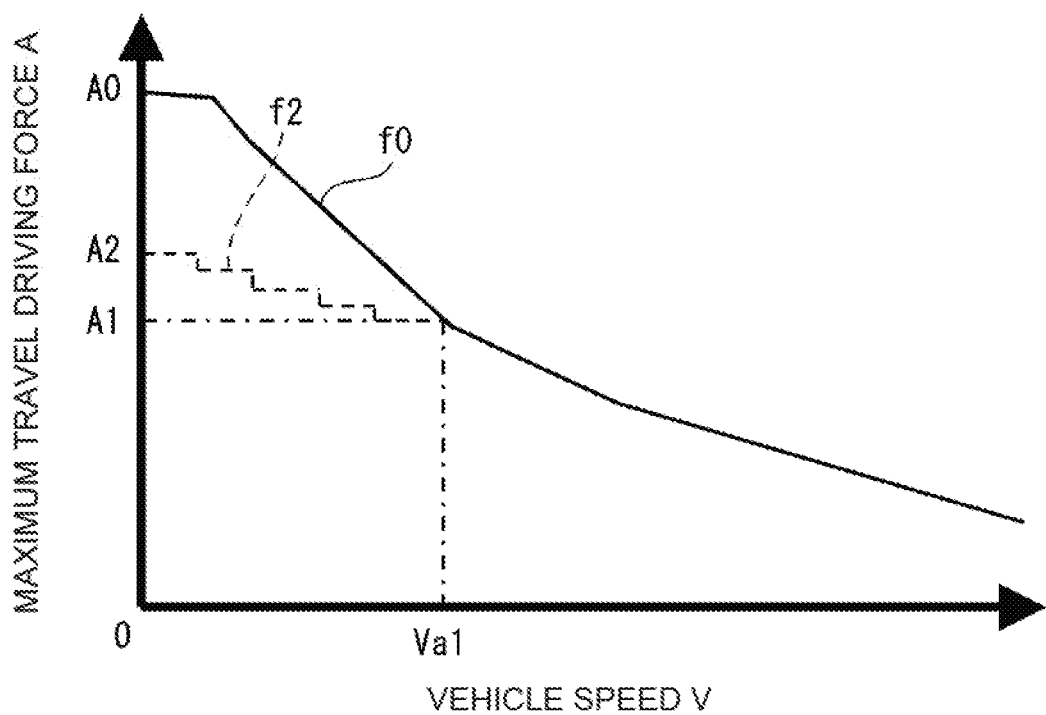
FIG. 9 is a travel performance diagram to show a relationship between a vehicle speed V and a maximum travel driving force A of a work vehicle related to a modification of the second embodiment.

A work vehicle related to a modification of the second embodiment will be described with reference to FIG. 9. FIG. 9 is a travel performance diagram to show a relationship between the vehicle speed V and the maximum travel driving force A of the work vehicle related to the second embodiment. In the second embodiment has been described an example in which, within the range in which the vehicle speed V is 0 or more and the threshold value Va1 for limit start determination or less, the maximum travel driving force A increases linearly as the vehicle speed V decreases. In contrast to this, in the modification of the second embodiment, within the range in which the vehicle speed V is 0 or more and the threshold value Va1 for limit start determination or less, the maximum travel driving force A increased stepwise as the vehicle speed V decreases. According to the modification of the second embodiment like this, the same operation and effect as the second embodiment can be acquired.

Third Embodiment

Figure 10:
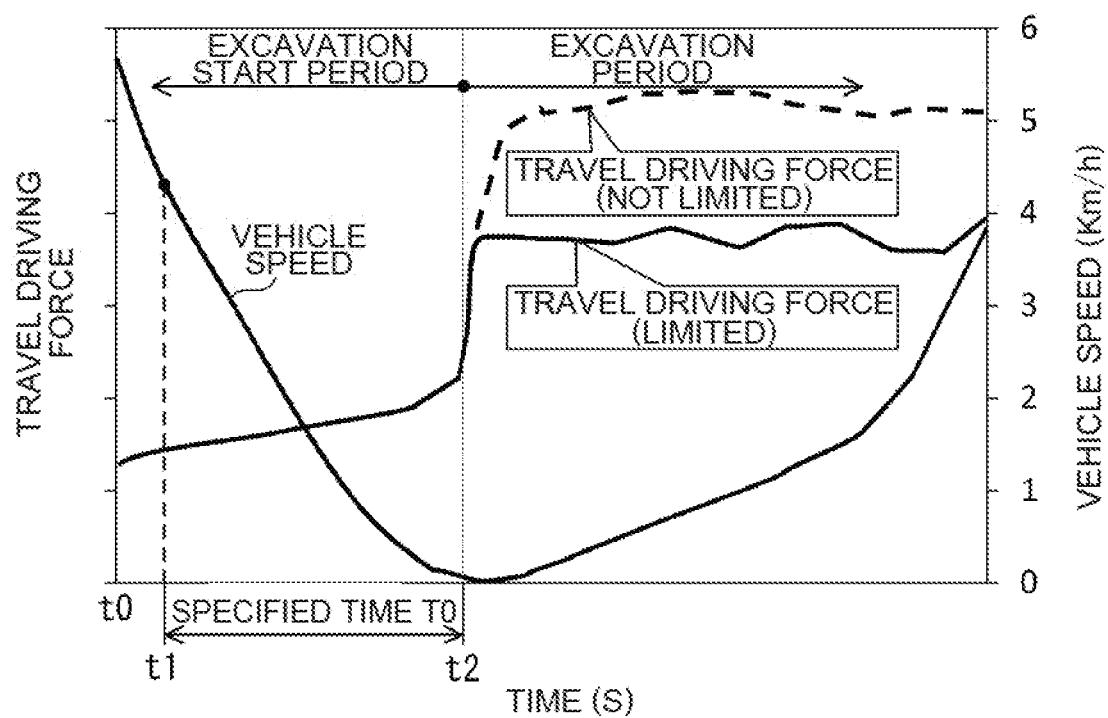
FIG. 10 is a time chart to show a change in a travel driving force and a change in a vehicle speed in an excavation work of a work vehicle related to a third embodiment.

A work vehicle related to the third embodiment will be described with reference to FIG. 10. In this regard, in the figure, the same or equivalent parts as in the second embodiment will be denoted by the same reference signs and different points will be mainly described. A wheel loader related to the third embodiment has the same composition as the second embodiment (see FIG. 2). FIG. 10 is a time chart to show a change in the travel driving force and the vehicle speed in an excavation work of the work vehicle related to the third embodiment. In this regard, a broken line shown in FIG. 10 shows a behavior of the travel driving force of the work vehicle of the second embodiment.

As shown in FIG. 2, the controller 10 has a work load pressure sensor 25 connected thereto. The work load pressure sensor 25 detects a discharge pressure (work load pressure) of the working hydraulic pump 4 and outputs a detection signal to the controller 10.

When a load pressure of the working hydraulic circuit HC2, which is detected by the work load pressure sensor 25, exceeds a predetermined pressure threshold value, the wheel loader related to the third embodiment limits the maximum travel driving force A. In this way, not only within an excavation start period of time that passes from when the wheel loader plunges into the object to be excavated such as the earth and sand until the wheel loader starts to operate the working device, but also within an excavation period of time that passes after the wheel loader starts to operate the working device, it is possible to prevent the travel driving force from being made excessively high and to make a balance between the travel driving force and the excavation force appropriate. As a result, a work efficiency of the whole excavation work can be improved.

Fourth Embodiment

Figure 11:
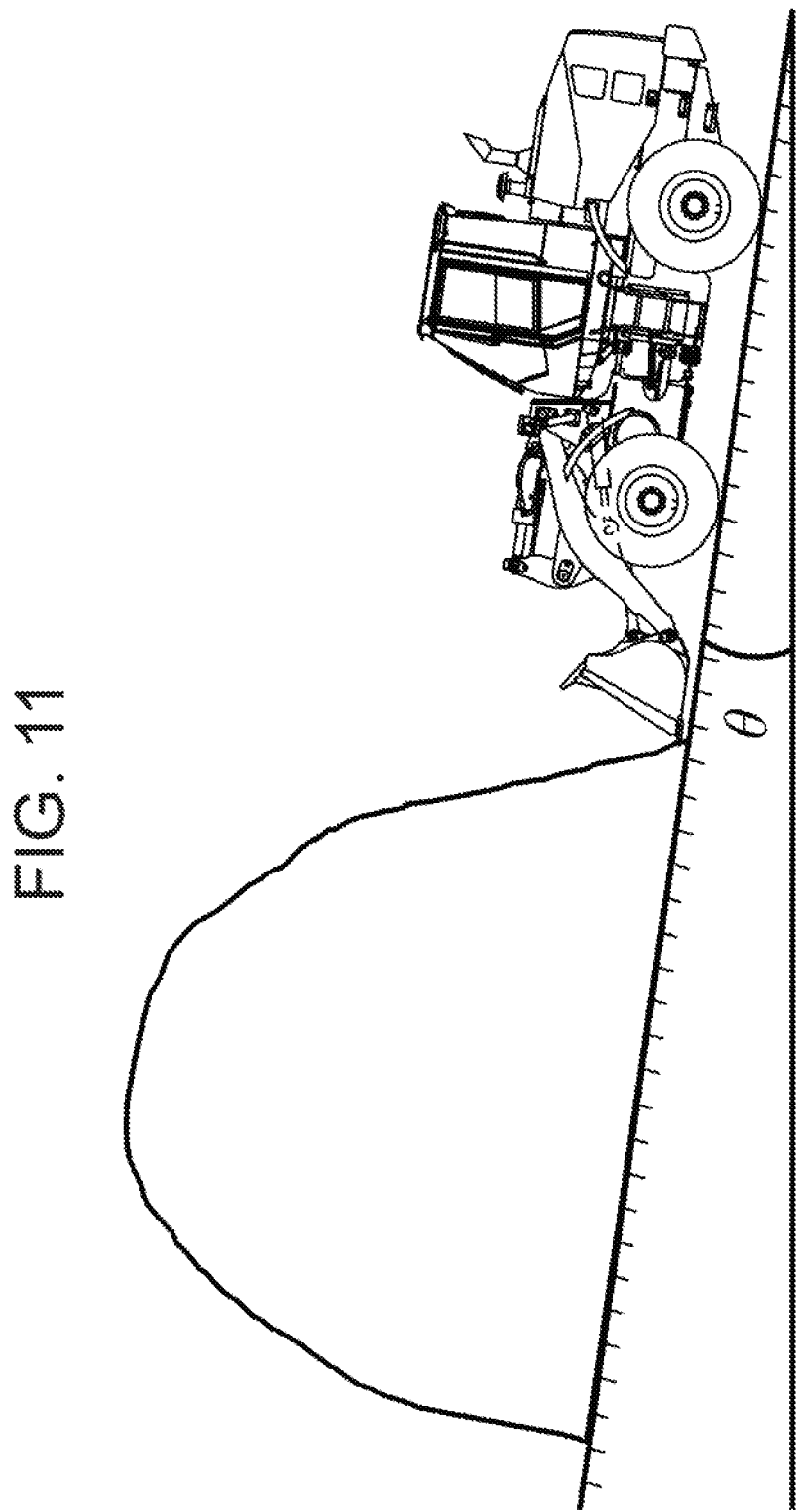
FIG. 11 is a figure to illustrate a state in which a wheel loader performs an excavation work on an inclined ground.

A work vehicle related to the fourth embodiment will be described with reference to FIG. 11 to FIG. 13. In this regard, in the figures, the same or equivalent parts as in the second embodiment will be denoted by the same reference signs and different points will be mainly described. A wheel loader related to the fourth embodiment has the same composition as the second embodiment (see FIG. 2). As shown in FIG. 2, the controller 10 has a tilting angle sensor 27 connected thereto. The tilting angle sensor 27 is, for example, a well-known angle-to-ground sensor of a pendulum type and detects a tilting angle θ of the wheel loader and outputs a detection signal to the controller 10.

In the fourth embodiment, the limit control section 10b of the controller 10 determines whether or not the tilting angle θ becomes a predetermined angle threshold value θ1 or more. FIG. 11 is a figure to illustrate a situation in which the wheel loader performs an excavation work in an inclined ground. In this regard, the tilting angle θ means a tilting angle from a horizontal surface when the wheel loader is tilted with an axis in a left and right direction in the center, that is, a pitch angle.

Figure 12:
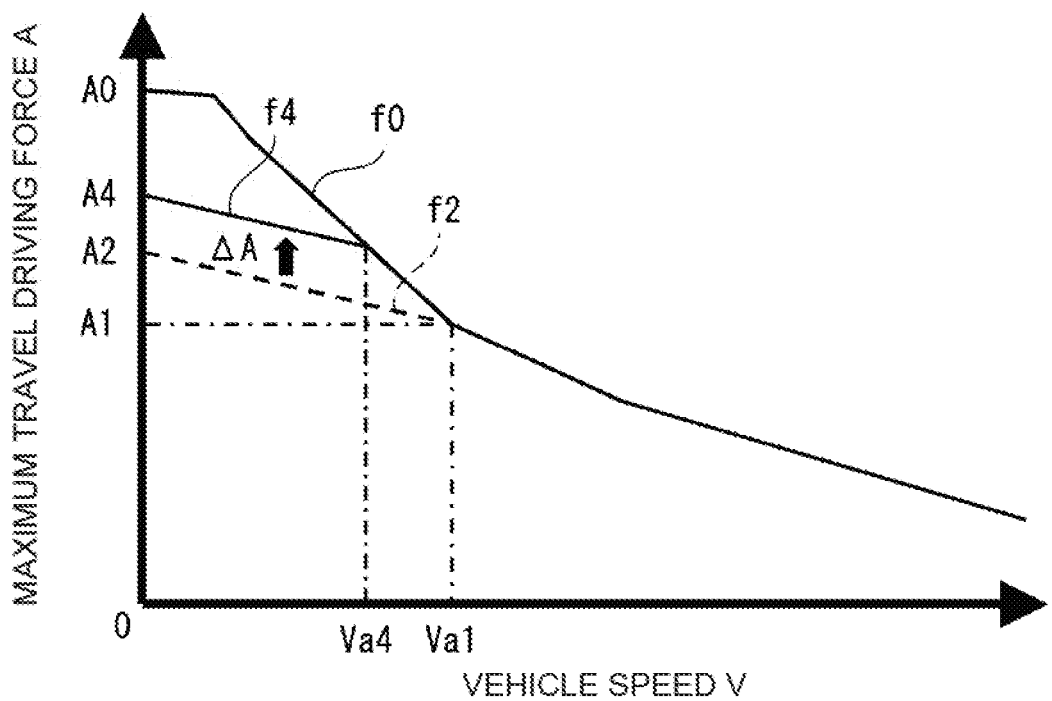
FIG. 12 is a travel performance diagram to show a relationship between a vehicle speed V and a maximum travel driving force A of a work vehicle related to a fourth embodiment.

FIG. 12 is a travel performance diagram to show a relationship between the vehicle speed V and the maximum travel driving force A of the work vehicle related to the second embodiment. In the second embodiment, within the range in which the vehicle speed V is 0 or more and the threshold value Va1 for limit start determination or less, the maximum travel driving force A increases gradually as the vehicle speed V decreases, and the maximum travel driving force A is limited in such a way that when the vehicle speed V is 0, the maximum travel driving force A becomes A2.

In the fourth embodiment, the limit control section 10b sets a first limit mode in a case where the tilting angle θ detected by the tilting angle sensor 27 is less than the angle threshold value θ1 and limits the maximum travel driving force A according to the characteristic f2 described in the second embodiment. In a case where the tilting angle θ detected by the tilting angle sensor 27 is the angle threshold value θ1 or more, the limit control section 10b sets a second limit mode and limits the maximum travel driving force A according to a characteristic f4.

As shown in the figure, within the range in which the vehicle speed V is 0 or more to the threshold value Va1 for limit start determination or less, the characteristic f4 is a value obtained by adding a predetermined correction value ΔA to the maximum travel driving force A of the characteristic f2. In this regard, an upper limit value of the maximum travel driving force A is determined by the characteristic f0. For this reason, in a case where the value obtained by adding the predetermined correction value ΔA to the maximum travel driving force A of the characteristic f2 (maximum travel driving force A after correction) exceeds the maximum travel driving force A determined by the characteristic f0 (upper limit value), the maximum travel driving force A is set to this upper limit. The correction value ΔA corresponds to a travel driving force required to climb up the inclined ground of the tilting angle θ and is stored previously in the storage device of the controller 10.

In the characteristic f4, the maximum travel driving force A is limited within the range in which the vehicle speed V is 0 or more to a threshold value Va4 for limit start determination or less. The threshold value Va4 for limit start determination is smaller than the threshold value Va1 for limit start determination (Va4<Va1). The characteristic f4 is the following characteristic: that is, within a range in which the vehicle speed V is 0 or more and the threshold value Va4 for limit start determination or less, the maximum travel driving force A increases linearly as the vehicle speed V decreases; and when the vehicle speed is 0, the maximum travel driving force A becomes A4. A large/small relation among A0, A4, and A2 is A0>A4>A2.

FIG. 13 is a flow chart to show a processing content of a driving force limit control by the controller 10 related to the fourth embodiment. A processing shown by the flow chart of FIG. 13 is started when an ignition switch is turned on and an initial setting (not shown in the drawing) is performed and then the processing after the step S110 are executed repeatedly at a predetermined control period. In this regard, not shown in the drawing, the controller 10 repeatedly acquires various kinds of information such as the information of the vehicle speed detected by the vehicle speed sensor 26, the information of the operation position of the mode switch 23, and the information of the tilting angle detected by the tilting angle sensor 27.

The flow chart shown in FIG. 13 has the processing of steps S440, S460, S465 added between the step S130 and step S170 shown in FIG. 5. If it is determined by the controller 10 in the step S130 that the vehicle speed V is the threshold value Va1 for limit start determination or less, the process proceeds to the step S440. In the step s440, the controller 10 determines whether or not the tilting angle θ detected by the tilting angle sensor 27 is the angle threshold value θ1 or more. If a negative determination is made in the step S440, the process proceeds to the step S460. If an affirmative determination is made in the step S440, the process proceeds to the step S465.

In the step S460, the controller 10 sets the first limit mode and the timer starts counting the time and then the process proceeds to the step S170. In the first limit mode, the travel driving force is limited according to the characteristic f2.

In the step S465, the controller 10 sets the second limit mode and starts counting the timer and then the process proceeds to the step S170. In the second limit mode, the travel driving force is limited according to the characteristic f4 in which a limit amount is smaller than the characteristic f2.

In this regard, the time during which the travel driving force is limited is the same in the first limit mode and in the second limit mode (see step S170).

According to the fourth embodiment like this, not only the same operation and effect as the second embodiment, but also the following operation and effect can be acquired.

(7) When the wheel loader performs the excavation work in the inclined ground, if the travel driving force is limited greatly at the time when the tilting angle θ of the wheel loader is large, there is a risk that the bucket 112 cannot be penetrated sufficiently into the object to be excavated and that an excavation amount will be reduced. In the present embodiment, the controller 10 sets the maximum travel driving force A, which is to be limited, on the basis of the tilting angle θ of the wheel loader detected by the tilting angle sensor 27. In this way, in a case where the wheel loader performs the excavation work in the inclined ground, it is possible to prevent the travel driving force from being reduced excessively and to make the balance between the resultant force of the inertial force and the travel driving force and the excavation force appropriate.

(Modification 1 of Fourth Embodiment)

Figure 14A:
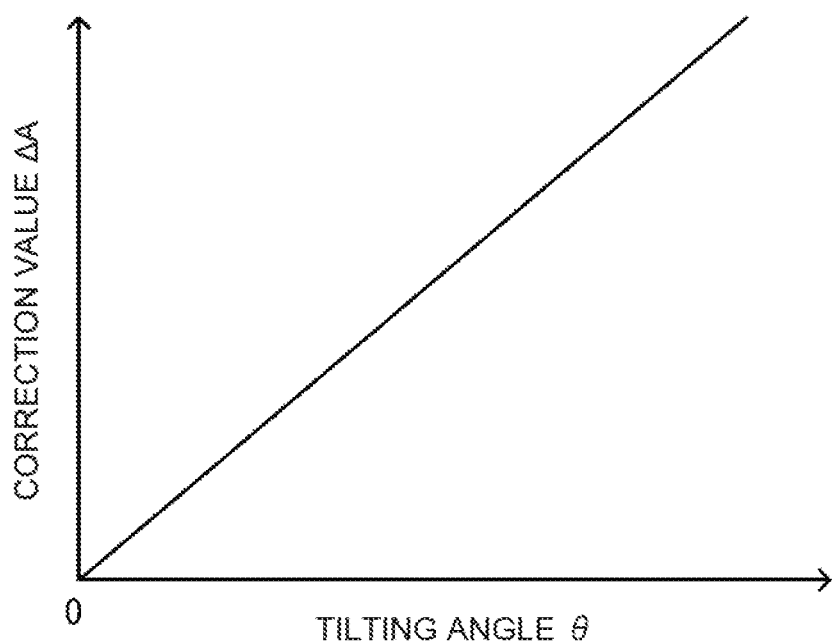
FIG. 14A is a graph to show a characteristic of a correction value ΔA that increases according to an increase in a tilting angle θ in a work vehicle related to a modification 1 of the fourth embodiment.

A work vehicle related to a modification 1 of the fourth embodiment will be described with reference to FIG. 14A. FIG. 14A is a graph to show a characteristic of a correction value ΔA which increases in response to an increase in the tilting angle θ in the work vehicle related to a modification 1 of the fourth embodiment. In the fourth embodiment has been an example in which the correction value ΔA is a constant value. In contrast to this, in the present modification 1, the correction value ΔA changes according to the tilting angle θ. As shown in FIG. 4(a), a characteristic of the correction value ΔA which increases linearly as the tilting angle θ increases is stored as a look-up table style in the storage device of the controller 10.

The limit control section 10b refers to a table of the characteristic of the correction value ΔA shown in FIG. 14A and calculates the correction value ΔA on the basis of the tilting angle θ detected by the tilting angle sensor 27. The limit control section 10b adds the correction value ΔA to the maximum travel driving force A set on the basis of the characteristic f2, thereby acquiring the maximum travel driving force A after correction. In this regard, in the case where the maximum travel driving force A after correction exceeds the maximum travel driving force A determined by the characteristic f0 (upper limit value), the maximum travel driving force A after correction is set to the upper limit value.

According to this modification 1, the travel driving force can be limited more appropriately according to the tilting angle θ.

(Modification 2 of Fourth Embodiment)

It is also recommended to perform the following processing for selecting the threshold value for limit start determination: that is, when the tilting angle θ is less than the angle threshold value θ1, Va1 is selected as a threshold value for limit start determination; and when the tilting angle θ is the angle threshold value θ1 or more, Va4 is selected as a threshold value for limit start determination. In this case, after the step S440 is executed, the processing for selecting the limit start determination is executed, and then it is determined whether or not the vehicle speed V is the threshold value (Va1 or Va4) or less, as is the case with the step S130.

In a case where the tilting angle θ is less than the angle threshold value θ1 and where the vehicle speed V is the threshold value Va1 for limit start determination or less, the limit control section 10b sets the first limit mode. In the first limit mode, the maximum travel driving force A is limited according to the predetermined characteristic f2. In a case where the tilting angle θ is the angle threshold value θ1 or more and where the vehicle speed V is the threshold value Va4 for limit start determination or less, the limit control section 10b sets the second mode. In the second mode, the maximum travel driving force A is limited according to the predetermined characteristic f4.

(Modification 3 of Fourth Embodiment)

A modification 3 of the fourth embodiment will be described with reference to FIG. 14B. In the fourth embodiment has been an example in which the vehicle speed (Va4) at which the limitation of the travel driving force is started in a case where the tilting angle θ is the angle threshold value θ1 or more is smaller than the vehicle speed (Va1) at which the limitation of the travel driving force is started in a case where the tilting angle θ is less than the angle threshold value θ1. However, the present invention is not limited to this.

Figure 14B:
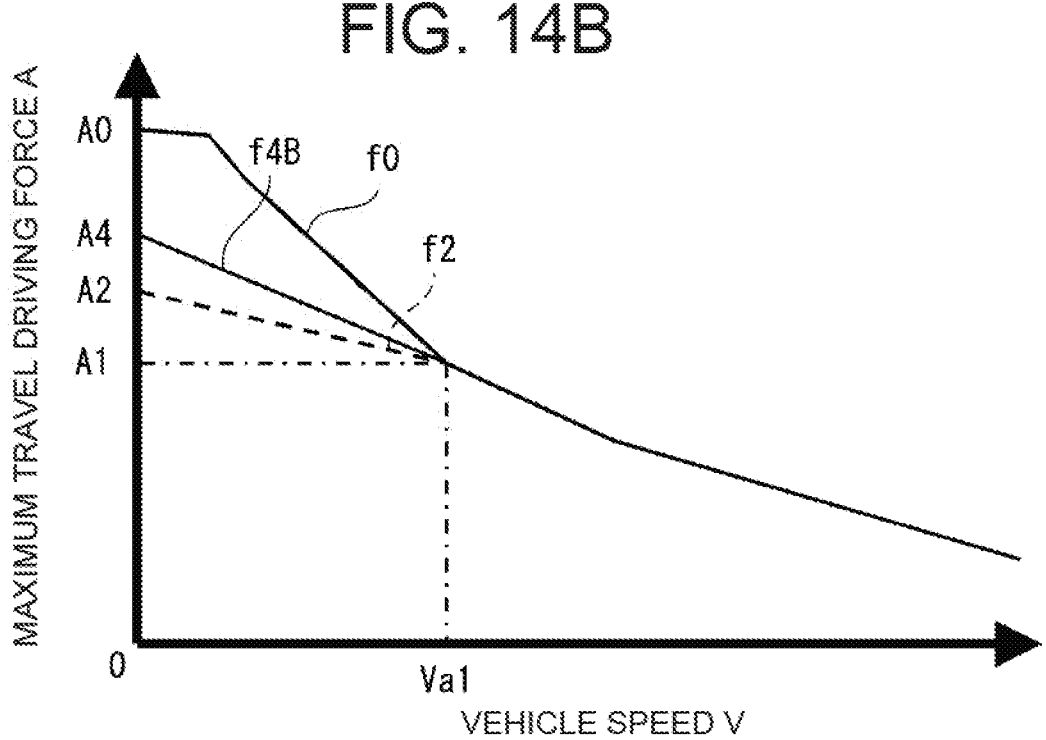
FIG. 14B is a travel performance diagram to show a relationship between a vehicle speed V and a maximum travel driving force A of a work vehicle related to a modification 3 of the fourth embodiment.

As shown in FIG. 14B, the characteristic f4B may be set in such a way that the vehicle speed at which the limitation of the travel driving force is started becomes Va1 regardless of the tilting angle θ. The characteristic f4B is a characteristic in which, within the range in which the vehicle speed V is 0 or more and the threshold value Va1 for limit start determination or less, the maximum travel driving force A increases linearly from A1 to A4 as the vehicle speed V decreases. In this way, the controller 10 can set the maximum travel driving force A, which is to be limited, on the basis of the tilting angle θ of a vehicle which is detected by the tilting angle sensor 27. In this regard, A4 is a maximum travel driving force smaller than A0 and larger than A2.

(Modification 4 of Fourth Embodiment)

In the fourth embodiment has been an example in which the time (T0) during which the limitation of the travel driving force is continued is the same in a case where the first limit mode is set as in a case where the second limit mode is set. However, the present invention is not limited to this. In a case where the tilting angle θ is large, because a deceleration after the wheel loader plunges into the object to be excavated is larger as compared with a case where the tilting angle θ is small (in other words, because the vehicle stops quickly), the time threshold value T0B in a case where the second limit mode is set may be made shorter as compared with the time threshold value T0A in a case where the first limit mode is set (T0B<T0A). In a case where the tilting angle θ is large, by shortening the time during which the limitation of the travel driving force is continued, the balance between the travel driving force and the excavation force can be made more appropriate according to the tilting angle θ.

Fifth Embodiment

Figure 15:
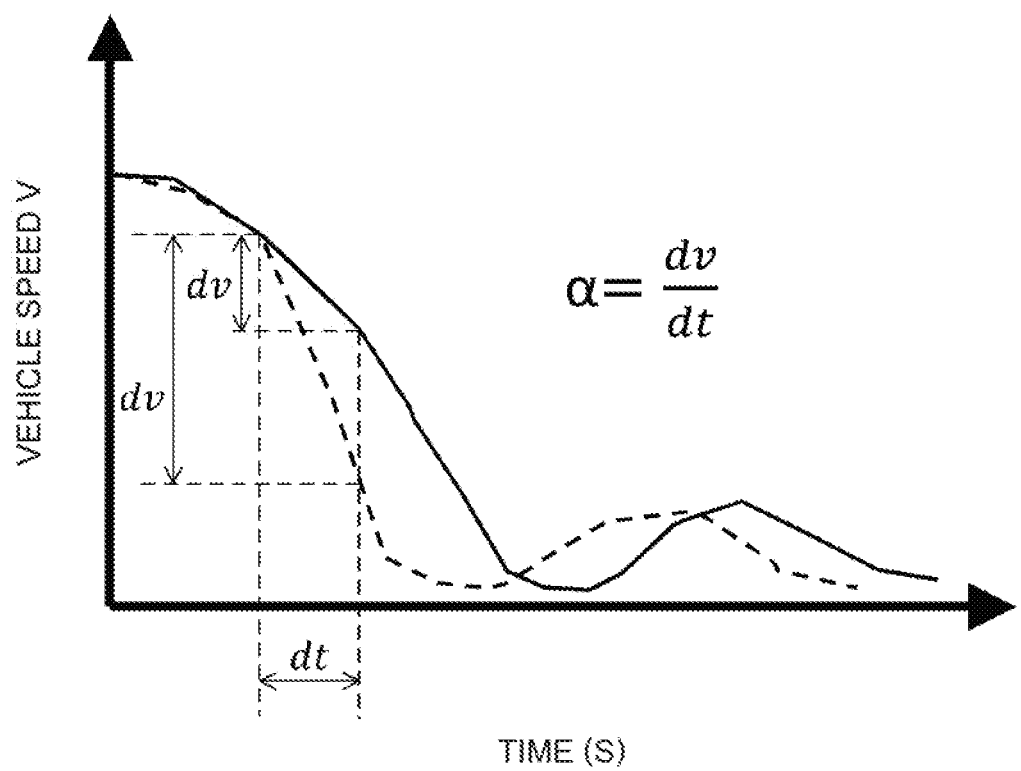
FIG. 15 is a graph to show a calculation of a time change rate α of a vehicle speed.

A work vehicle related to a fifth embodiment will be described with reference to FIG. 15 and FIG. 16. In this regard, in the figures, the same or equivalent parts as in the fourth embodiment will be denoted by the same reference signs and different points will be mainly described. A wheel loader related to the fifth embodiment has the same composition as the fourth embodiment (see FIG. 2).

The limit control section 10b of the controller 10 calculates a time change rate (acceleration and deceleration) of the vehicle speed V. FIG. 15 is a graph to illustrate the calculation of a time change rate α of the vehicle speed. The limit control section 10b calculates a change in the vehicle speed V in a specified control period on the basis of the vehicle speed V detected at each specified control period, for example, divides a difference dv between the vehicle speed V at a present control period and the vehicle speed V before one control period by time dt corresponding to the one control period to thereby calculate a time change rate α (=dv/dt) of the vehicle speed V.

In a case where the time change rate of the vehicle speed is a minus value, the time change rate of the vehicle speed expresses "deceleration". In a case where the time change rate of the vehicle speed is a plus value, the time change rate of the vehicle speed expresses "acceleration". When the work vehicle is decelerated, the limit control section 10*b* determines whether or not the time change rate α of the vehicle speed is less than a predetermined change rate threshold value α1. In other words, the limit control section 10*b* determines whether or not a deceleration |α| is larger than a predetermined deceleration |α1|. In a case where the bucket 112 is penetrated into the heavy and hard earth and sand (object to be excavated), the time change rate α of the vehicle speed is made smaller as compared with a case where the bucket 112 is penetrated into the light and soft earth and sand (object to be excavated) (α<0), that is, the deceleration |α| is made larger. The change rate threshold value |α1| is a minus value (α1<0) and is stored previously in the storage device of the controller 10.

In a case where the time change rate α of the vehicle speed is less than the change rate threshold value α1, the limit control section 10*b* sets a first time threshold value T1 to the time threshold value. In a case where the time change rate α of the vehicle speed is the change rate threshold value α1 or more, the limit control section 10*b* sets a second time threshold value T2 to a time threshold value. As the object to be excavated such as the earth and sand is heavier and harder, the deceleration of the wheel loader becomes larger and the time that passes until the wheel loader stops becomes shorter. Hence, it is preferable that a large/small relation between the first time threshold value T1, which is set in a case where the deceleration is large, and the second time threshold value T2, which is set in a case where the deceleration is small, is T1<T2.

Figure 16:
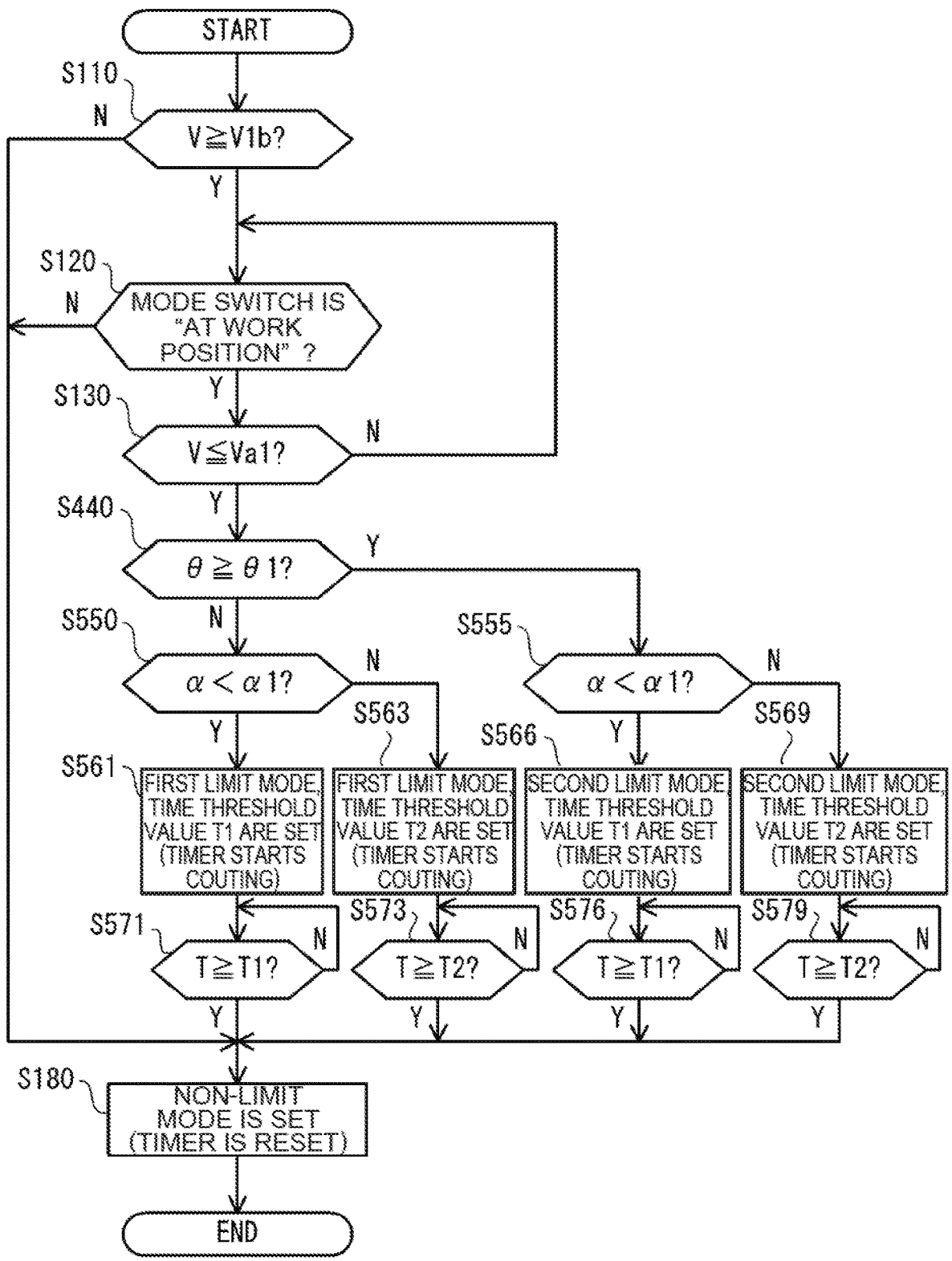
FIG. 16 is a flow chart to show a processing content of a driving force limit control by a controller related to a fifth embodiment.

FIG. 16 is a flow chart to show a processing content of the driving force limit control by the controller 10 related to the fifth embodiment. A processing shown by the flow chart of FIG. 16 is started when an ignition switch is turned on and an initial setting (not shown in the figure) is executed and then processing following the step S110 are repeatedly executed at each specified control period. In this regard, although not shown in the figure, the controller 10 repeatedly acquires various kinds of information such as information of the vehicle speed detected by the vehicle speed sensor 26, information of the operation position of the mode switch 23, and information of the tilting angle detected by the tilting angle sensor 27. Further, the controller 10 calculates the time change rate α of the vehicle speed on the basis of the vehicle speed V acquired at the control period and the time corresponding to the control period and stores the time change rate α of the vehicle speed in the storage device. In this regard, the time change rate α of the vehicle speed may be calculated as an average value in several control periods to several tens of control periods.

In the flow chart shown in FIG. 16, the steps S460, S465, S170 shown in FIG. 13 are deleted and processing of steps S550, S555, S561, S563, S566, S569, S571, S573, S576, S579 are added between the steps S440 and the S180. If it is determined by the controller 10 in the step S440 that the tilting angle θ is less than the angle threshold value θ1, the process proceeds to the step S550. The controller 10 determines in the step S550 whether or not the time change rate α of the vehicle speed is less than the change rate threshold value α1. If an affirmative determination is made in the step S550, that is, it is determined that the deceleration |α| is larger than the predetermined deceleration |α1|, the process proceeds to the step S561. If a negative determination is made in the step S550, that is, it is determined that the deceleration |α| is smaller than the predetermined deceleration |α1|, the process proceeds to the step S563.

In the step S561, the controller 10 sets the first limit mode and sets the first time threshold value T1 as the time threshold value and a timer starts counting time. Then, the process proceeds to the step S571.

In the step S571, the controller 10 determines whether or not the time T measured by the timer is the first time threshold value T1 or more. The controller 10 repeatedly executes the processing of the step S571 until an affirmative determination is made. If the affirmative determination is made in the step 571, the process proceeds to the step S180.

In the step S563, the controller 10 sets the first limit mode and sets the second time threshold value T2 as the time threshold value and the timer starts counting time. Then, the process proceeds to the step S573.

In the step S573, the controller 10 determines whether or not the time T measured by the timer is the second time threshold value T2 or more. The controller 10 repeatedly executes the processing of the step S573 until an affirmative determination is made. If the affirmative determination is made in the step 573, the process proceeds to the step S180.

If it is determined by the controller 10 in the step S440 that the tilting angle θ is the angle threshold value θ1 or more, the process proceeds to the step S555. In the step S555, the controller 10 determines whether or not the time change rate α of the vehicle speed is less than the change rate threshold value α1 as is the case with the step S550. If an affirmative determination is made in the step S555, the process proceeds to the step S566. If a negative determination is made in the step S555, the process proceeds to the step S569.

In the step S566, the controller 10 sets the second limit mode and sets the first time threshold value T1 as the time threshold value and the timer starts counting time. Then, the process proceeds to the step S576.

In the step S576, the controller 10 determines whether or not the time T measured by the timer is the first time threshold value T1 or more. The controller 10 repeatedly executes the processing of the step S576 until an affirmative determination is made. If the affirmative determination is made in the step 576, the process proceeds to the step S180.

In the step S569, the controller 10 sets the second limit mode and sets the second time threshold value T2 as the time threshold value and the timer starts counting time. Then, the process proceeds to the step S579.

In the step S579, the controller 10 determines whether or not the time T measured by the timer is the second time threshold value T2 or more. The controller 10 repeatedly executes the processing of the step S579 until an affirmative determination is made. If the affirmative determination is made in the step 579, the process proceeds to the step S180.

According to the fifth embodiment like this, not only the same operation and effect as the fourth embodiment but also the following operation and effect can be acquired.

(8) The time change rate of the vehicle speed (deceleration) of the wheel loader is calculated and the time threshold value (T1 of T2) to limit the travel driving force is set on the basis of the calculated time change rate of the vehicle speed (deceleration). In a case where the deceleration is large, the time that passed from when the wheel loader plunges into the object to be excavated until the wheel loader stops is made shorter as compared with a case where the deceleration is small. For this reason, when a period of time during which the travel driving force is limited is set as usual, the travel driving force is limited not only in a period of time which passes from when the wheel loader is plunged into the object to be excavated until the wheel loader is stopped but also in an elongated period of time in which the wheel loader performs the excavation work after the wheel load is stopped, which hence cannot output a sufficient travel driving force required to perform the excavation work and is liable to interfere with the excavation work. For this reason, by shortening the period of time during which the travel driving force is limited, it is possible to perform more appropriate excavation according to a difference in time which passes from when the wheel loader plunges into the object to be excavated until the wheel loader stops, the difference in time being caused by a difference in the weight and hardness of the object to be excavated such as the earth and sand.

(Modification 1 of Fifth Embodiment)

The limit control section 10b may limit the travel driving force according to a different travel performance characteristic in a case where the time change rate α of the vehicle speed is less than the change threshold value α1 and in a case where the time change rate α of the vehicle speed is the change threshold value α1 or more. For example, in a case where the time change rate α of the vehicle speed is less than the change threshold value α1 (in a case where the deceleration is large), as compared with a case where the time change rate α of the vehicle speed is the change threshold value α1 or more (in a case where the deceleration is small), the maximum travel driving force is limited in such a way that the maximum travel driving force becomes large, in other words, the limit amount becomes small. In this way, an excavation performance can be improved according to the weight and hardness of the object to be excavated such as earth and sand.

(Modification 2 of Fifth Embodiment)

In a case where the time change rate α of the vehicle speed is less than the change threshold value α1 (in a case where the deceleration is large), there may be set a vehicle speed threshold value for limit start that is higher than a vehicle speed threshold value for limit start that is set in a case where the time change rate α of the vehicle speed is the change threshold value α1 or more (in a case where the deceleration is small). If the vehicle speed is decreased rapidly in a case where the deceleration is large, by setting a high vehicle speed threshold value, it is possible to appropriately ensure a period of time during which the travel driving force is limited effectively, and thereby an excavation performance can be improved.

Sixth Embodiment

A work vehicle related to a sixth embodiment will be described with reference to FIG. 17 and FIG. 18. In this regard, in the figures, the same or equivalent parts as in the first embodiment will be denoted by the same reference signs and different points will be mainly described.

In the first to the fifth embodiments has been the work vehicle provided with the travel driving device including the HST circuit which is formed of the hydraulic pump of the variable displacement type (HST pump 2) and the hydraulic motor (HST motor 3) of the variable displacement type connected to each other so as to form the closed circuit. In contrast to this, in the sixth embodiment, the work vehicle is provided with electric motors (FM, RM) for travel. Also in a case where the travel driving force is outputted by the electric motor, the travel driving force is increased continuously and speedily in response to a decrease in the vehicle speed at the time of excavation, so the resultant force of the inertial force applied by the self-weight of the vehicle and the travel driving force tends to become excessive. For this reason, as is the case with the embodiments described above, by limiting the travel driving force, the excavation performance can be improved.

Figure 17:
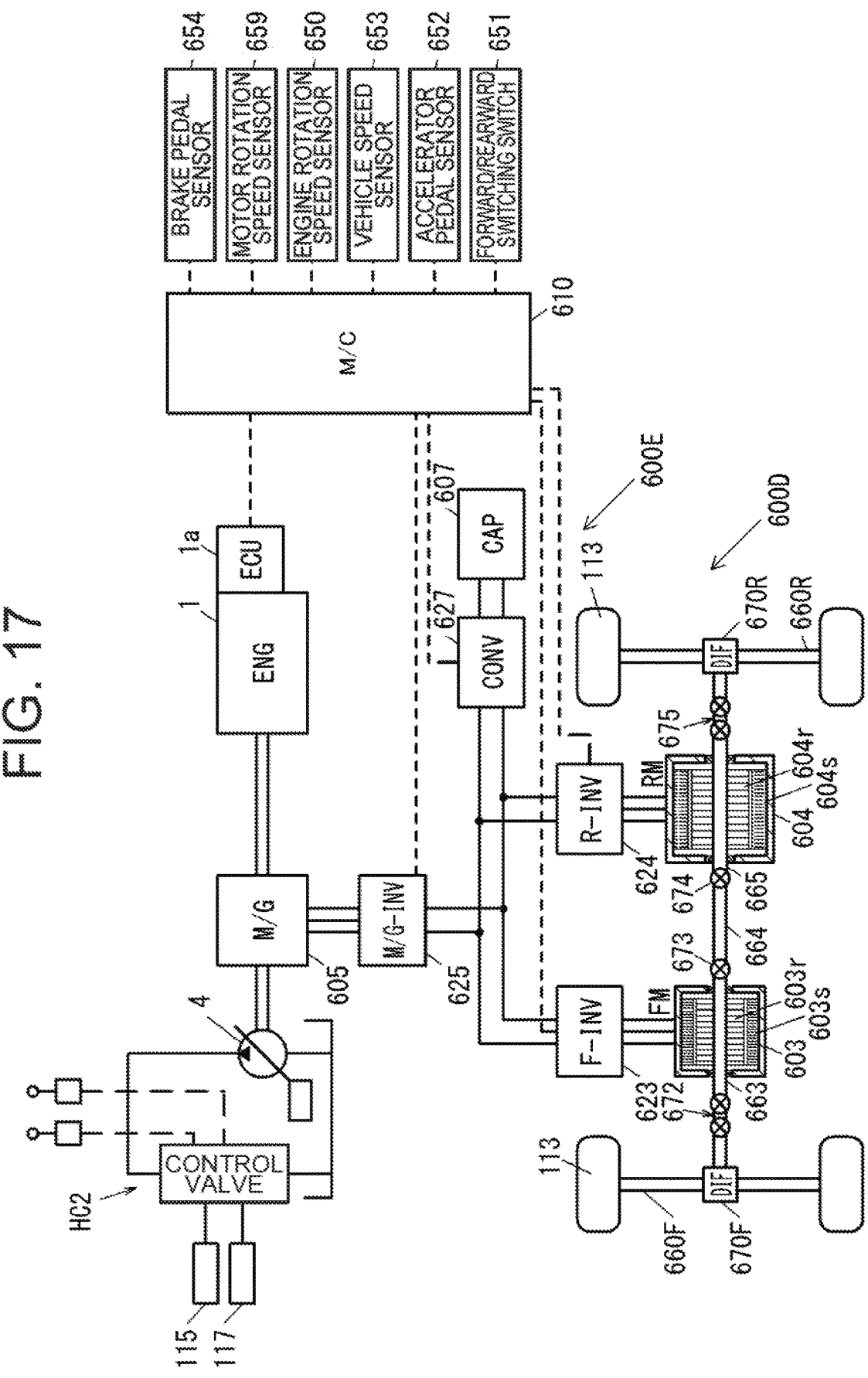
FIG. 17 is a block diagram to show an example of a composition of a work vehicle related to a sixth embodiment.

FIG. 17 is a figure to show an example of a composition of the work vehicle related to the sixth embodiment. The wheel loader is provided with a controller 610, an engine 1, an engine control part 1a, a working hydraulic circuit HC2, and a travel drive device 600D.

The travel drive device 600D is so composed as to include axles 660F, 660R, differential devices 670F, 670R, a propeller shaft 664, and a travel electric device 600E.

The travel electric device 600E is so composed as to include a motor/generator 605, a M/G inverter 625, a front motor 603 including a stator 603s and a rotor 603r, a front inverter 623, a rear motor 604 including a stator 604s and a rotor 604r, a rear inverter 624, a power storage element (for example, capacitor) 607, and a converter 627.

The rotor 603r of the front motor 603 and the rotor 604r of the rear motor 604 are connected to each other via the propeller shaft 664 having flexible couplings 673, 674 provided on both ends thereof. A rotor shaft 665 of the rotor 604r of the rear motor 604 is connected to the first flexible coupling 674 on the one end of the propeller shaft 664, whereas a rotor shaft 663 of the rotor 603r of the front motor 603 is connected to the second flexible coupling 673 on the other end of the propeller shaft 664. In this way, the rotor 603r of the front motor 603 and the rotor 604r of the rear motor 604 are coupled to each other by the propeller shaft 664 and the pair of flexible couplings 673, 674 and are rotated integrally.

A pair of front wheels (wheels 113 on the front side) are coupled to a front wheel side axle 660F, respectively. The front wheel side axle 660F is connected to the differential device 670F and the differential device 670F is coupled to the rotor shaft 663 of the front motor 603 via a coupling part 672 formed of a pair of flexible couplings. A pair of rear wheels (wheels 113 on the rear side) are coupled to a rear wheel side axle 660R, respectively. The rear wheel side axle 660R is connected to the differential device 670R and the differential device 670R is coupled to the rotor shaft 665 of the rear motor 604 via a coupling part 675 formed of a pair of flexible couplings.

The motor/generator 605 is coupled to an output shaft of the engine 1 and is driven by the engine 1, thereby functioning as a generator to generate a three-phase alternating current power. The three-phase alternating current power is converted into a direct current power by the M/G inverter 625 and the direct current power is supplied to the front inverter 623 and the rear inverter 624. In this regard, in a case where a charging rate is decreased to a specified value, the direct current power converted by the M/G inverter 625 is supplied also to the power storage element 607 via the converter 627, and thereby the power storage element 607 is charged.

Each of the M/G inverter 625, the front inverter 623, and the rear inverter 624 is a power conversion device to convert the direct current power into the alternating current power or to convert the alternating current power into the direct current power. The M/G inverter 625, the front inverter 623, and the rear inverter 624 are connected to the power storage element 607 via the converter 627. The converter 627 steps up or down a voltage to be charged to or discharged from the power storage element 607.

The power storage element 607 is an electric double-layer capacitor that can store electric power generated by a certain degree of electric work (for example, work of several tens kw and several seconds) and that can discharge electric charges stored in a desired period. The power storage element 607 is charged by the direct current power converted by the front inverter 623, the rear inverter 624, and the M/G inverter 625.

The direct current power converted by the M/G inverter 625 and/or the direct current power outputted from the power storage element 607 is converted into the three-phase alternating current power by the front inverter 623 and the rear inverter 624. The front motor 603 and the rear motor 604 are driven respectively by the three-phase alternating current power converted by the front inverter 623 and the rear inverter 624, thereby generating a rotational torque. The rotational torque generated by the front motor 603 and the rear motor 604 is transmitted to the front side and the rear side wheels 113 via the differential devices 670F, 670R and the axles 660F, 660R.

Meanwhile, when a regenerative braking is operated, the front motor 603 and the rear motor 604 are rotated by the rotational torque transmitted from the wheels 113, thereby generating the three-phase alternating current power. The three-phase alternating current power generated by the front motor 603 and the rear motor 604 is converted into the direct current power by the front inverter 623 and the rear inverter 624, respectively, and is supplied to the power storage element 607 via the converter 627, and thereby the power storage element 607 is charged by the direct current power converted by the front inverter 623 and the rear inverter 624.

The controller 610 is so composed as to include an arithmetic processing unit including a CPU, a ROM and a RAM which are storage devices, and other peripheral circuit. The controller 610 controls a whole system including a travel system and a hydraulic work system of the wheel loader and controls respective sections in such a way that the whole system exerts a maximum performance.

To the controller 610 are inputted signals of a forward/backward switching switch 651, an accelerator pedal sensor 652, a vehicle speed sensor 653, a brake pedal sensor 654, an engine rotation speed sensor 650, and a motor rotation speed sensor 659.

The forward/backward switching switch 651 outputs a forward/backward switch signal, which commands the vehicle to travel forward/backward, to the controller 610. The accelerator pedal sensor 652 detects a pedal manipulated variable of an accelerator pedal (not shown in the figure) and outputs an accelerator signal to the controller 610. The vehicle speed sensor 653 detects a vehicle travel speed (vehicle speed) of the wheel loader and outputs a vehicle speed signal to the controller 610. The brake pedal sensor 654 detects a pedal manipulated variable of a brake pedal (not shown in the figure) and outputs a brake signal to the controller 610.

The engine rotation speed sensor 650 detects an actual rotation speed of the engine 1 and outputs an actual rotation speed signal to the controller 610. The motor rotation speed sensor 659 detects rotation speeds of the front motor 603 and the rear motor 604 and outputs a motor rotation speed signal to the controller 610. In this regard, either the motor rotation speed sensor 659 or the vehicle speed sensor 653 may be omitted. For example, the vehicle speed sensor 653 may be omitted and the vehicle speed may be calculated on the basis of the motor rotation speed detected by the motor rotation speed sensor 659.

The controller 610 calculates a required torque according to vehicle information including the pedal manipulated variable of the accelerator pedal (not shown in the figure) and controls the engine 1, the front inverter 623, and the rear inverter 624 in such a way that the front motor 603 and the rear motor 604 output the required torque.

The controller 610 calculates a power generation amount necessary for the front motor 603 and the rear motor 604 on the basis of the required torque. The controller 610 calculates a target engine rotation speed for producing a specified power generation amount by the motor/generator 605 and outputs an engine drive control signal on the basis of the calculated target engine rotation speed to the engine control parts 1a and outputs a drive signal for converting the three-phase alternating current power generated by the motor/generator 605 into the direct current power to the M/G inverter 625.

The engine control part 1a compares an actual engine rotation speed Na of the engine 1 detected by the engine rotation speed sensor 650 with the target engine rotation speed Nt from the controller 610 and controls a fuel injection device (not shown in the figure) so as to bring the actual engine rotation speed Na of the engine 1 close to the target engine rotation speed Nt.

The controller 610 controls the engine 1, the M/G inverter 625, the front inverter 623 and the rear inverter 624, and the converter 627 according to an operating state of the vehicle, that is, a vehicle speed information, a manipulated variable of the accelerator pedal, and a charging rate in such a way that a state of charge (SOC) of the power storage element 607 does not become smaller than a specified lower limit value and larger than a specified upper limit value.

Figure 18A:
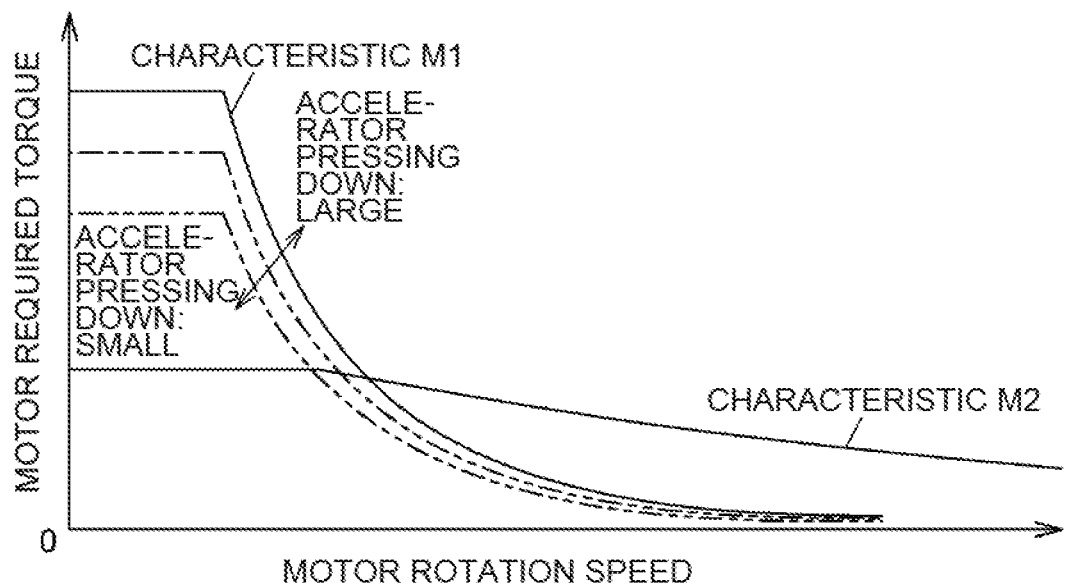
FIG. 18A is a graph to show a motor required torque map (motor characteristic).

The controller 610 calculates a motor required torque required of the front motor 603 and the rear motor 604. FIG. 18A is a graph to show a motor required torque map (motor characteristic). The motor required torque map is a map to express a torque curve (characteristic M2) of the front motor 603 and a torque curve (characteristic M1) of the rear motor 604.

As shown in FIG. 18A, the front motor 603 and the rear motor 604 are different from each other in the characteristic. The front motor 603 is a high-speed type motor (characteristic M2) having a characteristic in which a large torque cannot be outputted in a low speed range but in which a torque can be outputted to a high speed rotation. The rear motor 604 is a low-speed type motor (characteristic M2) having a characteristic in which a torque cannot be outputted to a high speed rotation but in which a large torque can be outputted in a low speed range. The front motor 603 and the rear motor 604 are different from each other in an operation range in which the torque can be outputted at a high efficiency, which can realize an electric motor driving at a high efficiency in a wide power performance required of the vehicle.

The respective characteristic M1 and characteristic M2 are set in such a way that the motor required torque is proportional to the accelerator signal and is inversely proportional to the rotation speed of the rear motor 604 and the front motor 603 and are stored in the storage device of the controller 610.

In other words, the controller 610 has a relationship between the accelerator signal and the outputs of the front motor 603 and the rear motor 604 set thereto in such a way that the outputs of the front motor 603 and the rear motor 604 increase or decrease in response to an increase or a decrease in the accelerator signal inputted from the accelerator pedal sensor 652. The controller 610 determines a torque curve according to the accelerator signal and refers to the rotation speeds at that time of the front motor 603 and the rear motor 604 to the torque curve, thereby determining the motor required torque. The controller 610 determines the respective required torques of the front motor 603 and the rear motor 604 and generates motor driving signals by a well-known method on the basis of the required torques and outputs the motor driving signals to the front inverter 623 and the rear inverter 624.

When the accelerator signal, the brake signal, the forward/backward switching signal, which correspond to an operation command, and a present vehicle travel speed (vehicle speed) are inputted to the controller 610, the controller 610 calculates the required torque required from the vehicle on the basis of these pieces of information. The required torque is a total of the motor required torque of the rear motor 604 and the motor required torque of the front motor 603.

In the storage device of the controller 610 is stored an efficiency data table of the rear motor 604 and the front motor 603 and the controller 610 determines the distribution of the torque on the basis of the efficiency data table in such a way that a maximum electric motor efficiency can be acquired to the required torque. When the controller 610 outputs the determined distribution of the torque as a torque command to control devices (not shown in the figure) included respectively in the rear inverter 624 and the front inverter 623, the controller 610 performs a torque limit processing based on limitations of a hybrid system and the vehicle and outputs an RM torque command and an FM torque command. The rear inverter 624 and the front inverter 623 supply an armature winding (stator winding) of each of the rear motor 604 and the front motor 603 with the three-phase alternating current power on the basis of the RM torque command and the FM torque command, thereby rotating the rotors 603r, 604r to make the vehicle travel.

Figure 18B:
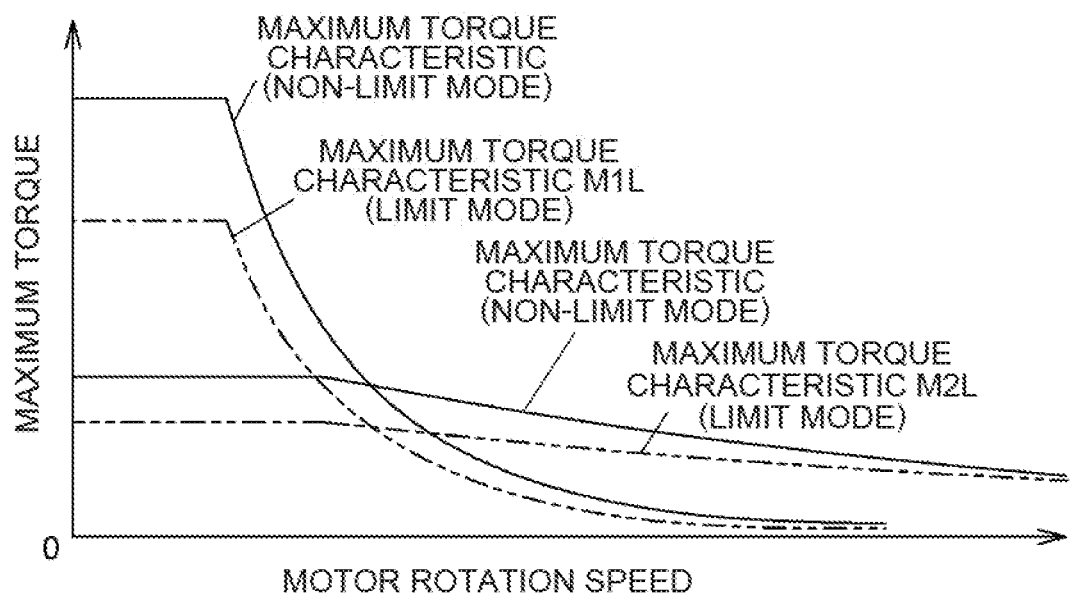
FIG. 18B is a graph to show a maximum torque map.

In the present embodiment, the controller 610 has functions of the mode setting section 10a and the limit control section 10b, which have been described in the first embodiment, and sets a limit mode in a case where the limit condition is satisfied and sets a non-limit mode in a case where the limit condition is not satisfied. FIG. 18B is a graph to show a maximum torque map and shows a maximum torque characteristic when the non-limit mode is set and maximum torque characteristics M1L, M2L when the limit mode is set. In the storage device of the controller 610 is stored a table of the maximum torque characteristic M1L for limiting the torque. When the limit mode is set, for example, even if the accelerator pedal is pressed down to the maximum, the motor required torque of the rear motor 604 is limited to the maximum torque characteristic M1L. Similarly, in the storage device of the controller 610 is stored a table of the maximum torque characteristic M2L for limiting the torque. When the limit mode is set, for example, even if the accelerator pedal is pressed down to the maximum, the motor required torque of the front motor 603 is limited to the maximum torque characteristic M2L.

When the non-limit mode is set, the controller 610 determines the required torque of each of the rear motor 604 and the front motor 603 according to the characteristic M1 and the characteristic M2 according to the pressing amount of the accelerator pedal (see FIG. 18A). When the limit mode is set, in a case where the required torque of the rear motor 604, which is calculated on the basis of the characteristic M1 is more than the maximum torque (upper limit value) set by the maximum torque characteristic M1L, the controller 610 sets the required torque to the upper limit value (see FIG. 18B). Similarly, when the limit mode is set, in a case where the required torque of the front motor 603, which is calculated on the basis of the characteristic M2, is more than the maximum torque (upper limit value) set by the maximum torque characteristic M2L, the controller 610 sets the required torque to the upper limit value (see FIG. 18B)

According to the sixth embodiment like this, the same operation and effect as the first embodiment can be acquired.

Seventh Embodiment

A work vehicle related to a seventh embodiment will be described with reference to FIG. 19. In this regard, in the figure, the same or equivalent parts as in the first embodiment will be denoted by the same reference signs and different points will be mainly described. In this regard, in FIG. 19, the high voltage selector valve 16, the check valves 11A, 11B, and the overload relief valve 13 in the HST circuit will be omitted.

The work vehicle related to the seventh embodiment is provided with a travel drive device 730 including a HMT (Hydro-Mechanical Transmission) 703A, a propeller shaft 704, a differential device 705, and an axle 706.

An output shaft of the engine 1 is coupled to the HMT 703A. FIG. 19 is a figure to show a general composition of the work vehicle related to the seventh embodiment. The HMT 703A is provided with an HST circuit (travel hydraulic circuit HC1) and a mechanical transmission part 732 and transmits the driving force of the engine 1 to the HST circuit and the mechanical transmission part 732 in parallel. The rotation of the output shaft of the engine 1 is shifted by the HMT 703A. The shifted rotation is transmitted to the wheels 113 via the propeller shaft 704, the differential device 705, and the axle 706, and the wheel loader travels.

The HMT 703A is provided with a clutch device 716 including a forward hydraulic clutch (hereinafter referred to as a forward clutch 718) and a backward hydraulic clutch (hereinafter referred to as a backward clutch 719). When a pressure (clutch pressure) of the pressure oil supplied via the transmission control device (not shown in the figure) increases, the forward clutch 718 and the backward clutch 719 perform an engaging (connecting) operation, whereas when the clutch pressure decreases, the forward clutch 718 and the backward clutch 719 perform a disengaging (disconnecting) operation.

The output shaft of the engine 1 is coupled to a clutch shaft 722. In a case where the forward clutch 718 is in an engaged state, the backward clutch 719 is in a disengaged state and the clutch shaft 722 rotates integrally with the forward clutch 718 and makes the wheel loader travel in a forward direction. In a case where the backward clutch 719 is in an engaged state, the forward clutch 718 is in a disengaged state and the clutch shaft 722 rotates integrally with the backward clutch 719 and makes the wheel loader travel in a backward direction.

A rotational force of the clutch shaft 722 is transferred to an input shaft 723 via a gear. The input shaft 723 has a sun gear 747 of a planetary gear mechanism 740A fixed thereto. The sun gear 747 has a plurality of planetary gears 748 meshed with its outer periphery. Each of the planetary gears 748 is journaled by a planetary carrier 749 and the planetary carrier 749 is fixed to an output shaft 750. The output shaft 750 is connected to the propeller shaft 704 described above. The plurality of planetary gears have a ring gear 741 meshed with their outer peripheries and the ring gear 741 has a pump input gear 742 meshed with its outer periphery. The pump input gear 742 is fixed to a rotary shaft of the travel hydraulic pump (HST pump 2). The HST pump 2 has a travel hydraulic motor (HST motor 3) connected thereto in a closed circuit. The rotary shaft of the HST motor 3 has a motor output gear 754 fixed thereto and the motor output gear 754 is meshed with a gear 743A of the output shaft 750.

The HST pump 2 is a variable displacement hydraulic pump of a swash plate type or an inclined shaft type in which a displacement volume is varied according to a tilting angle. The displacement volume is controlled by a regulator 2r. Although not shown in the figure, the regulator 2r is provided with a tilting cylinder and a forward/backward switching valve switched in response to a forward/backward switching signal sent from a controller 710. The tilting cylinder is supplied with a control pressure via the forward/backward switching valve, and a displacement volume is controlled according to the control pressure, and according to the switching of the forward/backward switching valve, an operation direction of the tilting cylinder is controlled and a tilting direction of the HST pump 2 is controlled.

The HST motor 3 is a variable displacement hydraulic pump of a swash plate type or an inclined shaft type in which a displacement volume is varied according to a tilting angle. When a control signal is outputted from the controller 710 to a regulator 3r for a motor (not shown in the figure), a displacement volume of the HST motor 3 (motor capacity) is controlled. In order to prevent an engine stall from being caused, in a case where an actual engine rotation speed Na is lower than a target engine rotation speed Nt and a difference between the actual engine rotation speed Na and the target engine rotation speed Nt is large, the controller 710 controls the displacement volume so as to become smaller as compared with a case where the difference is small.

In this way, the present embodiment employs the HNT 703A of an input dividing type. In the HNT 703A of an input dividing type, the HST motor 3, which is connected to the HST pump 2 coupled to the planetary gear mechanism 740A by the hydraulic circuit, is so composed as to be coupled to the output shaft 750 of the transmission device at a constant rotation ratio. An output torque of the engine 1 is transmitted to the HST circuit and the mechanical transmission part 732 in parallel via the planetary gear mechanism 740A, and the wheels 113 are driven.

Also in the work vehicle provided with the HMT 703A like this, by controlling the displacement volume qm of the HST motor 3 and the travel load pressure Pt to thereby limit the maximum travel driving force A immediately after the wheel loader is plunged into the object to be excavated in the excavation work, the same operation and effect as the first embodiment can be acquired.

(Modification 1 of Seventh Embodiment)

In the embodiment described above, the HMT 703A of the input dividing type (see FIG. 19) has been described as an example, but the present invention is not limited to this. In place of the HMT 703A of the input dividing type, as shown in FIG. 20, an HMT 703B of an output dividing type may be employed. In this regard, in FIG. 20, a travel driving device is shown and a working hydraulic circuit HC2 is omitted. In the HMT 703B of an output dividing type, the HST pump 2 connected to the HST motor 3, which is coupled to a planetary gear mechanism 740B, by the hydraulic circuit is so composed as to be coupled to the input shaft 723 of the transmission device at a constant rotation ratio. In the present modification, an output torque of the engine 1 is transmitted to the HST circuit and the mechanical transmission part 732 in parallel and is transmitted further to the planetary gear mechanism 740B, and thereby the wheels 113 are driven.

As shown in FIG. 20, in the HMT 703B of an output dividing type, a rotational force of the input shaft 723 is transmitted to the HST circuit via a gear 743B of the input shaft 723 and the pump input gear 742. Further, the input shaft 723 has the sun gear 747 of the planetary gear mechanism 740B fixed thereto. The sun gear 747 has a plurality of planetary gears 748 meshed with its outer periphery. Each planetary gear 748 is journaled by the planetary carrier 749 and the planetary carrier 749 is fixed to the output shaft 750. The output shaft 750 is connected to the propeller shaft 704 described above. The plurality of planetary gears have a ring gear 741 meshed with their outer peripheries and the ring gear 741 has the motor output gear 754 meshed with its outer periphery. The motor output gear 754 is fixed to the rotary shaft of the HST motor 3.

(Modification 2 of Seventh Embodiment)

Figure 19:
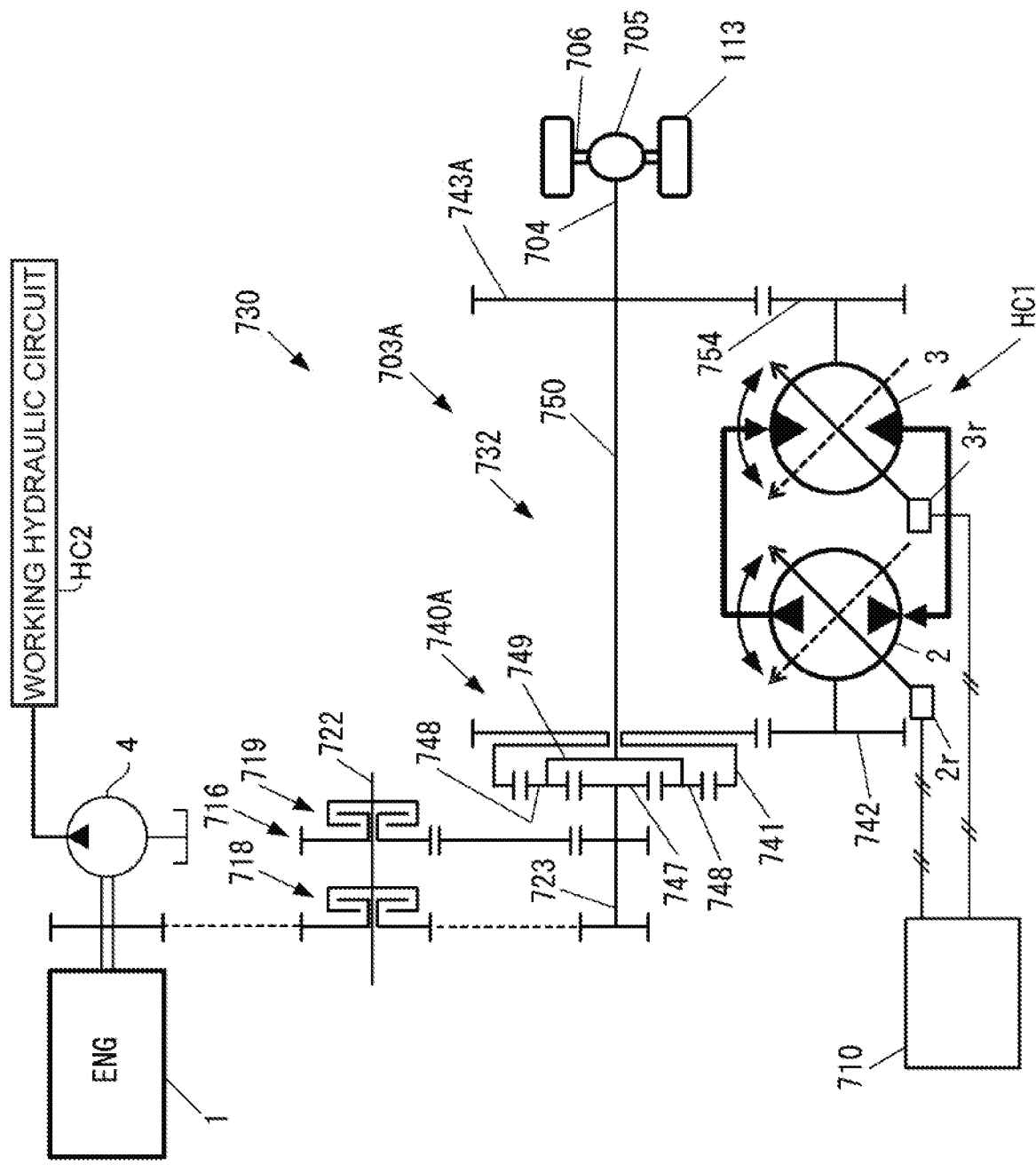
FIG. 19 is a block diagram to show a general composition of a work vehicle related to a seventh embodiment.
Figure 20:
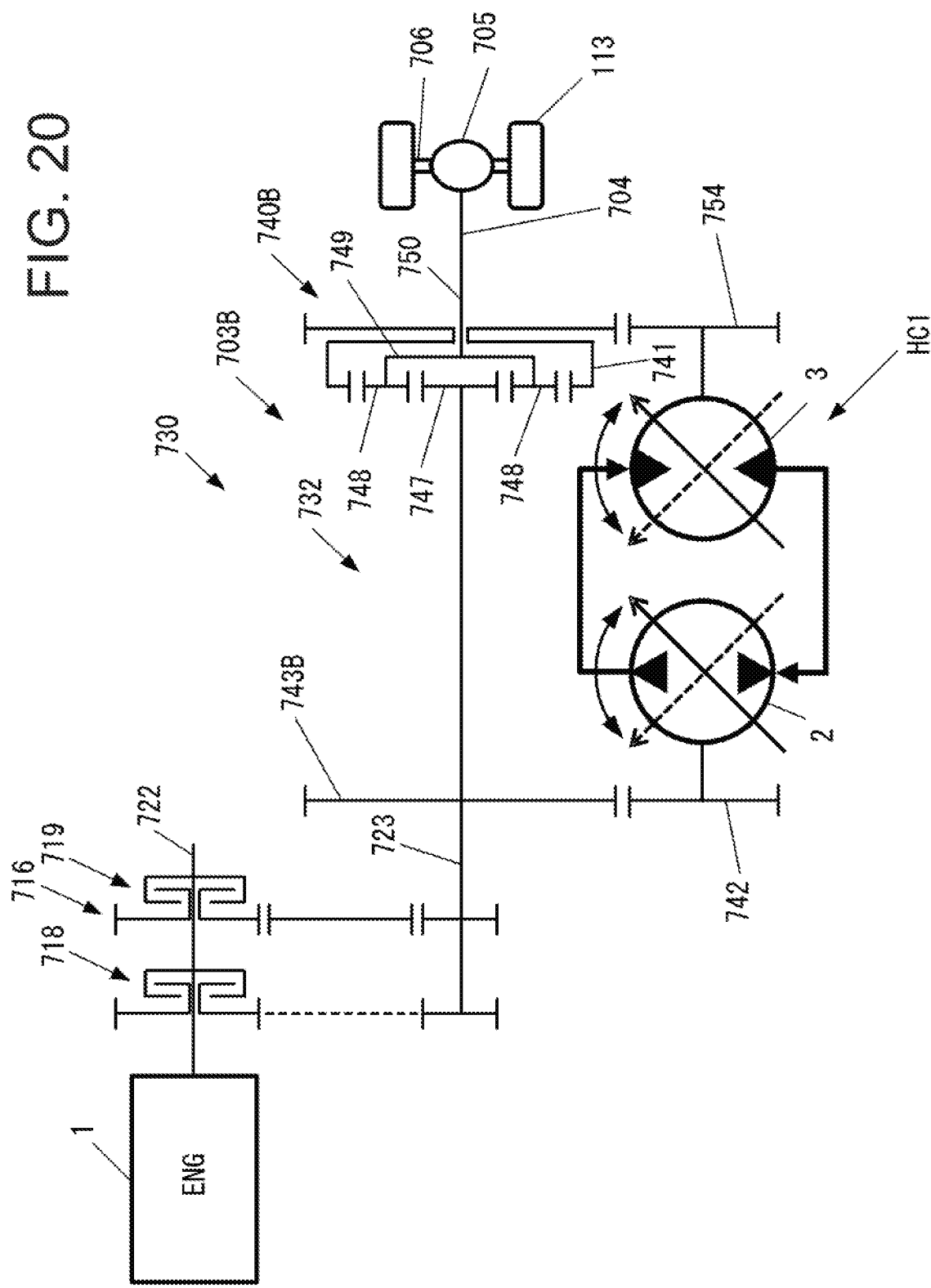
FIG. 20 is a block diagram to show a general composition of a work vehicle related to a modification 1 of the seventh embodiment.

The present invention may be applied to a wheel loader provided with an EMT (Electro-Mechanical Transmission) in place of the HMTs 703A, 703B shown in FIG. 19 and FIG. 20. In this case, a generator 840 is provided in place of the HST pump 2 and an electric motor 850 is provided in place of the HST motor 3.

Figure 21:
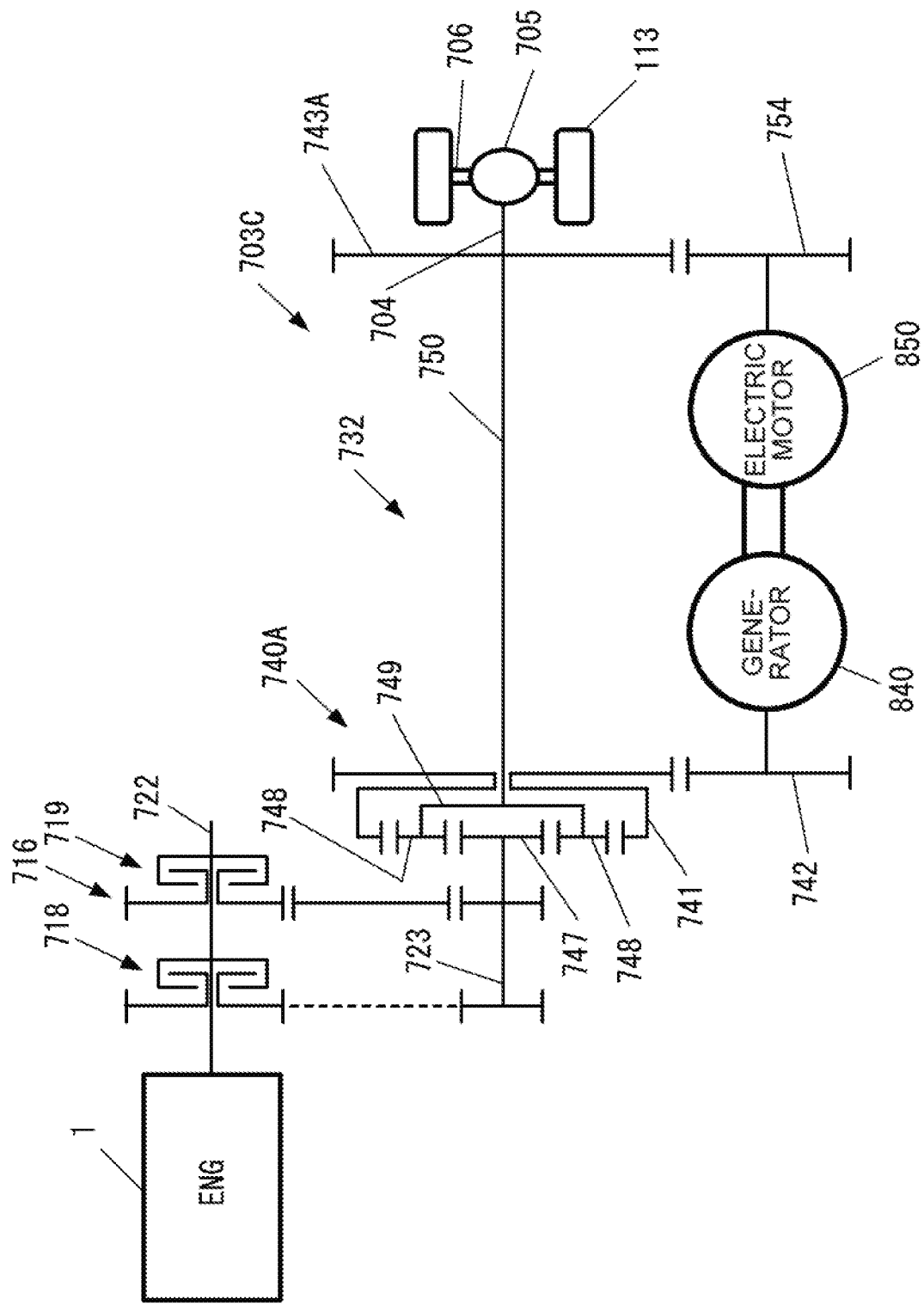
FIG. 21 is a block diagram to show a general composition of a work vehicle related to a modification 2 of the seventh embodiment.

In the present modification 2, as shown in FIG. 21, the output torque of the engine 1 is transmitted to the planetary gear mechanism 740A and then is transmitted in parallel to an electrical torque transmission by the generator 840 and the electric motor 850 and to a torque transmission of a mechanical direct drive by the mechanical transmission part 732, to drive the wheels 113. Alternatively, although not shown in the figure, it is also recommended that the output torque of the engine 1 be transmitted in parallel to an electrical torque transmission by the generator 840 and the electric motor 850 and to a torque transmission of a mechanical direct drive by the mechanical transmission part 732 and then be transmitted to the planetary gear mechanism, to drive the wheels 113.

When the limit condition is set, in the EMT 703C, a maximum value of the motor required torque of the electric motor 850 is limited by a controller (not shown in the figure) and a balance between the travel driving force and the excavation force is made appropriate.

The following modifications are also within the scope of the present invention and one or a plurality of modifications can be combined with the embodiments described above.

(Modification 1)

Figure 22A:
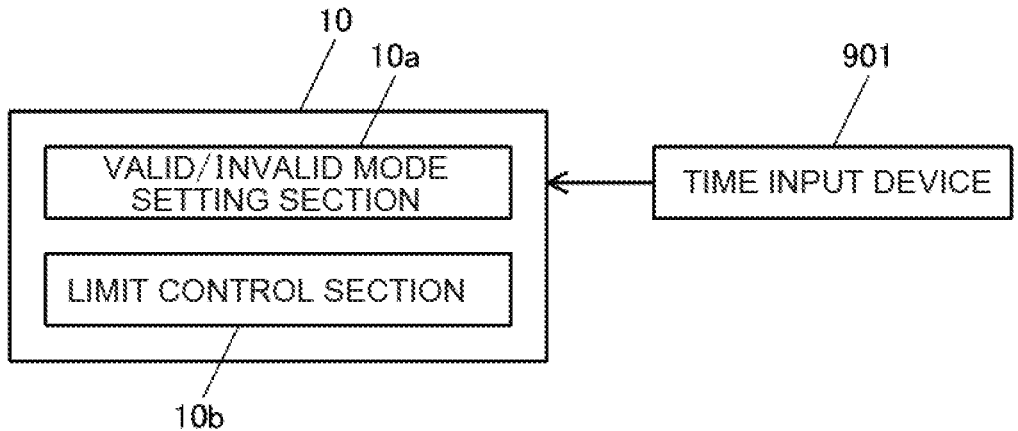
FIG. 22A is a block diagram to show a work vehicle related to other modifications.

In the embodiments described above has been an example in which the time threshold value is set on the basis of the tilting angle θ of the work vehicle and the time change rate α of the vehicle speed of the work vehicle, but the present invention is not limited to this. As shown in FIG. 22A, there may be provided a time input device 901 for setting an arbitrary time threshold value. The time input device 901 may be an input operation device of a dial type or may be an input device for selecting one of a plurality of operation positions (for example, a heavy excavation operation position or a light excavation operation position). The limit control section 10b of the controller 10 sets the time threshold value on the basis of a signal from the time input device 901. In this way, the operator can set the time threshold value arbitrarily according to the weight or hardness of the object to be excavated such as the earth and sand, or an inclination of the ground surface and a state of a road surface.

(Modification 2)

Figure 22B:
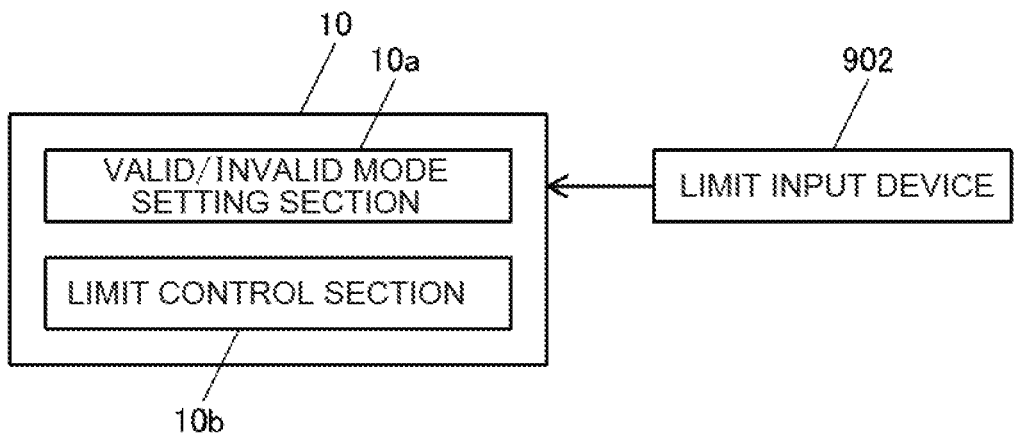
FIG. 22B is a block diagram to show a work vehicle related to other modifications.

In the embodiments described above has been an example in which the magnitude of the maximum travel driving force A, that is, a limit amount of the maximum travel driving force is set on the basis of the tilting angle θ of the work vehicle and the time change rate α of the vehicle speed of the work vehicle, but the present invention is not limited to this. For example, as shown in FIG. 22B, there may be provided a limit input device 902 for setting a characteristic of an arbitrary maximum travel driving force. The limit input device 902 may be an input operation device of a dial type or may be an input device for selecting one of a plurality of operation positions (for example, a heavy excavation operation position or a light excavation operation position). The limit control section 10b of the controller 10 sets the characteristic of the maximum travel driving force A on the basis of a signal from the limit input device 902. In this way, the operator can set the maximum travel driving force after limitation arbitrarily according to the weight or hardness of the object to be excavated such as earth and sand, or an inclination of the ground surface and a state of a road surface.

(Modification 3)

Figure 22C:
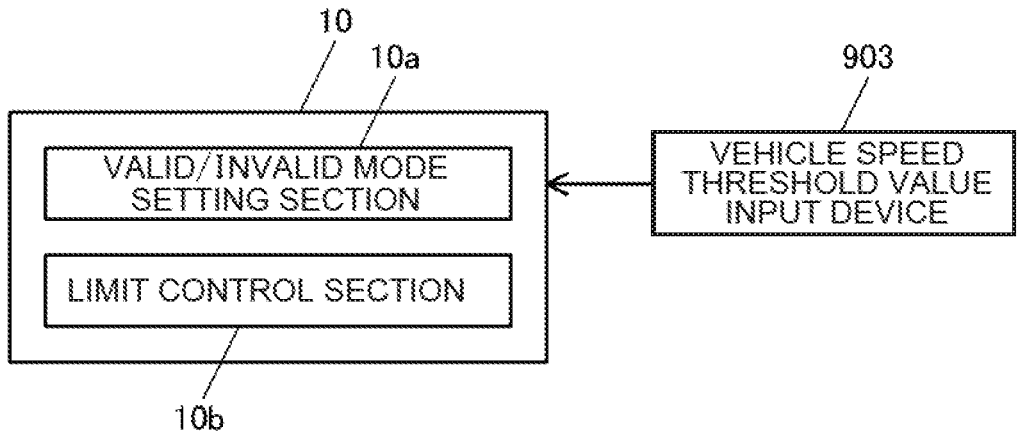
FIG. 22C is a block diagram to show a work vehicle related to other modifications.

In the embodiments described above has been an example in which the vehicle speed threshold value is set on the basis of the tilting angle θ of the work vehicle and the time change rate α of the vehicle speed of the work vehicle, but the present invention is not limited to this. For example, as shown in FIG. 22C, there may be provided a vehicle speed threshold value input device 903 for setting an arbitrary vehicle speed threshold value. The vehicle speed threshold value input device 903 may be an input operation device of a dial type or may be an input device for selecting one of a plurality of operation positions (for example, a heavy excavation operation position or a light excavation operation position). The limit control section 10b of the controller 10 sets the vehicle speed threshold value on the basis of a signal from the vehicle speed threshold value input device 903. In this way, the operator can set the vehicle speed threshold value arbitrarily according to the weight or hardness of the object to be excavated such as earth and sand, or an inclination of a ground surface and a state of a road surface.

(Modification 4)

In the embodiments described above has been the following example: that is, the controller 10 determines whether or not the vehicle speed V detected by the vehicle speed sensor 26 is higher than the threshold value Vb1 for validity determination; and in a case where the vehicle speed V is decreased from a state where the vehicle speed V is higher than the threshold value Vb1 for validity determination to a state where the vehicle speed V is the threshold values Va1, Va4 or less, the maximum travel driving force is limited during the specified time. However, the present invention is not limited to this. When the vehicle speed V becomes higher than the threshold value Va1 for limit start determination, the controller 10 may set the valid mode. In this regard, as described in the first embodiment, by setting the valid mode when the vehicle speed V becomes higher than the threshold value Vb1 for validity determination, hunting between the limit control and the non-limit control can be prevented, which is appropriate.

(Modification 5)

In the embodiments described above has been an example in which the controller 10 sets the valid mode/invalid mode by taking the operation position of the mode switch 23 into account, but the present invention is not limited to this. The controller 10 may set the valid mode in a case where the valid individual condition 1 is satisfied and may set the invalid mode in a case where the valid individual condition 1 is not satisfied. In this case, the mode switch 23 can be omitted.

(Modification 6)

In the embodiments described above, the wheel loader has been described as an example of the work vehicle, but the present invention is not limited to this. For example, the present invention can be applied to various kinds of work vehicles such as a wheel shovel and a telehandler.

Various embodiments and modifications have been described above, but the present invention is not limited to these contents. Other modifications thought within a scope of a technical idea of the present invention shall be included within a scope of the present invention.

REFERENCE SIGNS LIST

1 . . . engine
2 . . . HST pump
3 . . . HST motor
4 . . . working hydraulic pump
10 . . . controller (control device)
10a . . . valid/invalid mode setting section (mode setting section)
10b . . . limit control section
23 . . . mode switch
26 . . . vehicle speed sensor (vehicle speed detection device)
27 . . . tilting angle sensor (tilting angle detection device)
111 . . . arm
112 . . . bucket
115 . . . bucket cylinder
117 . . . arm cylinder
600D . . . travel drive device
610 . . . controller (control device)
653 . . . vehicle speed sensor (vehicle speed detection device)
710 . . . controller (control device)
730 . . . travel drive device
840 . . . generator
850 . . . electric motor
901 . . . time input device
902 . . . limit input device
903 . . . vehicle speed threshold value input device
A . . . maximum travel driving force
C0 . . . non-limit characteristic
C1 . . . limit characteristic
T0, T0A, T0B, T1, T2 . . . time threshold value (specified time)
Va1, Va2 . . . threshold value for limit start determination (first vehicle speed threshold value)
Vb1 . . . threshold value for validity determination (second vehicle speed threshold value)

The invention claimed is:

1. A work vehicle comprising:
a working device that includes an arm and a bucket;
a vehicle speed detection device that detects a vehicle speed;
a travel drive device that increases travel driving force in response to a decrease in the vehicle speed at a time of excavation; and
a control device that controls the travel driving force by the travel drive device,
wherein the control device includes:
a storage section that stores a predetermined first vehicle speed threshold value and a second vehicle speed threshold value that is higher than the predetermined first vehicle speed threshold value; and
a limit control section that limits the travel driving force during a specified time which passes from when the bucket of the work vehicle penetrates into material to be excavated until an operation of the working device is started in a case where the vehicle speed detected by the vehicle speed detection device is determined to be higher than the second vehicle speed threshold value and where the vehicle speed becomes the first vehicle speed threshold value or less from a state where the vehicle speed is higher than the second vehicle speed threshold value.

2. The work vehicle according to claim 1, wherein the limit control section of the control device sets the specified time on the basis of a signal from a time input device.

3. The work vehicle according to claim 1, wherein the limit control section of the control device sets a limit amount of the travel driving force on the basis of a signal from a limit input device.

4. The work vehicle according to claim 1, wherein the limit control section of the control device limits the travel driving force in such a way that the travel driving force is increased as the vehicle speed detected by the vehicle speed detection device decreases.

5. The work vehicle according to claim 1, wherein the limit control section of the control device sets the first vehicle speed threshold value on the basis of a signal from a vehicle speed threshold value input device.

6. The work vehicle according to claim 1, comprising
a tilting angle detection device that detects a tilting angle of the work vehicle,
wherein the control device sets at least any one of the travel driving force to be limited, the first vehicle speed threshold value, and the specified time on the basis of the tilting angle of the work vehicle detected by the tilting angle detection device.

7. The work vehicle according to claim 1, wherein the control device calculates a time change rate of the vehicle speed of the work vehicle and sets at least any one of the travel driving force to be limited, the first vehicle speed threshold value, and the specified time on the basis of the calculated time change rate of the vehicle speed.

8. The work vehicle according to claim 1, comprising
a mode setting section that sets a mode to invalidate a limitation of the travel driving force during a specified time after the vehicle speed detected by the vehicle speed detection device becomes the first vehicle speed threshold value or less.

* * * * *